(12) United States Patent
Rayo Mayoral et al.

(10) Patent No.: US 9,896,628 B2
(45) Date of Patent: Feb. 20, 2018

(54) MESOPOROUS COMPOSITE OF MOLECULAR SIEVES FOR HYDROCRACKING OF HEAVY CRUDE OILS AND RESIDUES

(71) Applicant: INSTITUTO MEXICANO DEL PETROLEO, Mexico City (MX)

(72) Inventors: Patricia Rayo Mayoral, Mexico City (MX); Jorge Ancheyta Juarez, Mexico City (MX); Gustavo Jesus Marroquin Sanchez, Mexico City (MX); Guillermo Centeno Nolasco, Mexico City (MX); Jorge Fernando Ramirez Solis, Mexico City (MX)

(73) Assignee: Instituto Mexicano del Petroleo, Mexico City (MX)

( * ) Notice: Subject to any disclaimer, the term of this patent is extended or adjusted under 35 U.S.C. 154(b) by 640 days.

(21) Appl. No.: 14/073,505

(22) Filed: Nov. 6, 2013

(65) Prior Publication Data
US 2014/0124410 A1    May 8, 2014

(30) Foreign Application Priority Data
Nov. 6, 2012    (MX) .................... MX/a/2012/012877

(51) Int. Cl.
| | |
|---|---|
| B01J 29/06 | (2006.01) |
| C10G 47/20 | (2006.01) |
| B01J 29/80 | (2006.01) |
| B01J 29/14 | (2006.01) |
| B01J 29/16 | (2006.01) |
| B01J 29/03 | (2006.01) |
| B01J 29/035 | (2006.01) |
| B01J 29/04 | (2006.01) |
| C10G 45/08 | (2006.01) |
| C10G 45/12 | (2006.01) |
| B01J 37/08 | (2006.01) |
| B01J 21/12 | (2006.01) |
| B01J 23/883 | (2006.01) |
| B01J 29/08 | (2006.01) |
| B01J 29/10 | (2006.01) |
| B01J 35/02 | (2006.01) |
| B01J 37/02 | (2006.01) |
| B01J 35/10 | (2006.01) |
| B01J 37/00 | (2006.01) |

(52) U.S. Cl.
CPC .............. *C10G 47/20* (2013.01); *B01J 21/12* (2013.01); *B01J 23/883* (2013.01); *B01J 29/0308* (2013.01); *B01J 29/0356* (2013.01); *B01J 29/0358* (2013.01); *B01J 29/041* (2013.01); *B01J 29/044* (2013.01); *B01J 29/045* (2013.01); *B01J 29/084* (2013.01); *B01J 29/106* (2013.01); *B01J 29/146* (2013.01); *B01J 29/166* (2013.01); *B01J 29/80* (2013.01); *B01J 35/026* (2013.01); *B01J 35/1019* (2013.01); *B01J 35/1038* (2013.01); *B01J 35/1042* (2013.01); *B01J 35/1061* (2013.01); *B01J 37/0201* (2013.01); *B01J 37/08* (2013.01); *C10G 45/08* (2013.01); *C10G 45/12* (2013.01); *B01J 35/109* (2013.01); *B01J 35/1057* (2013.01); *B01J 37/0018* (2013.01); *B01J 2229/186* (2013.01)

(58) Field of Classification Search
USPC ......................................... 502/64, 66, 74, 79
See application file for complete search history.

(56) References Cited

U.S. PATENT DOCUMENTS

| | | | |
|---|---|---|---|
| 3,304,254 A | 2/1967 | Eastwood et al. | |
| 3,459,680 A | 8/1969 | Plank et al. | |
| 3,969,222 A | 7/1976 | Hayes | |
| 4,111,846 A | 9/1978 | Elliott, Jr. | |
| 4,419,271 A | 12/1983 | Ward | |
| 4,422,959 A | 12/1983 | Lawson et al. | |
| 4,604,187 A | 8/1986 | Ward | |
| 4,689,137 A | 8/1987 | Clark | |
| 4,818,739 A | 4/1989 | Gortsema et al. | |
| 4,894,142 A | 1/1990 | Steigleder | |
| 4,988,659 A | 1/1991 | Pecoraro | |
| 5,221,648 A * | 6/1993 | Wachter ................... | B01J 29/06 502/64 |
| 5,620,590 A | 4/1997 | Absil et al. | |
| 6,399,530 B1 | 6/2002 | Chen et al. | |
| 8,540,952 B2 * | 9/2013 | Swallow ............ | B01D 53/9418 423/213.2 |
| 2004/0014593 A1 * | 1/2004 | Le Van Mao .......... | B01J 21/066 502/71 |
| 2005/0201920 A1 * | 9/2005 | Shan ....................... | B01J 21/06 423/335 |
| 2005/0227863 A1 * | 10/2005 | Choudhary .............. | B01J 21/16 502/214 |
| 2009/0139898 A1 * | 6/2009 | Long ..................... | B01J 23/002 208/46 |
| 2009/0234152 A1 * | 9/2009 | Schlosberg .......... | B01J 29/0308 560/127 |
| 2010/0099553 A1 * | 4/2010 | Sietsma .................... | B01J 23/70 502/259 |
| 2012/0184430 A1 * | 7/2012 | Lee ........................... | B01J 21/08 502/84 |
| 2012/0308439 A1 * | 12/2012 | Chen .................... | B01D 53/945 422/180 |

(Continued)

OTHER PUBLICATIONS

Thielemann, J. et al., Pore structure and surface area of silica SBA-15: influence of washing and scale-up, Beilstein J. Nanotechnol. 2011, 2, 110-118.

*Primary Examiner* — Elizabeth Wood
(74) *Attorney, Agent, or Firm* — Dickinson Wright, PLLC

(57) ABSTRACT

A hydrocracking catalyst having a support of a composite of mesoporous materials, molecular sieves and alumina, is used in the last bed of a multi-bed system for treating heavy crude oils and residues and is designed to increase the production of intermediate distillates having boiling points in a temperature range of 204° C. to 538° C., decrease the production of the heavy fraction (>538° C.), and increase the production of gasoline fraction (<204° C.). The feedstock to be processed in the last bed contains low amounts of metals and is lighter than the feedstock that is fed to the first catalytic bed.

12 Claims, 22 Drawing Sheets

(56) References Cited

U.S. PATENT DOCUMENTS

| | | |
|---|---|---|
| 2013/0056394 A1 | 3/2013 | Ancheyta Juarez et al. |
| 2013/0253079 A1* | 9/2013 | Jothimurugesan ..... C10G 2/334 518/715 |
| 2013/0299388 A1* | 11/2013 | Bulut ..................... B01J 29/042 208/111.3 |
| 2014/0228606 A1* | 8/2014 | Narayanaswamy ..... C10G 1/10 585/241 |
| 2014/0296596 A1* | 10/2014 | Chaumonnot ....... B01J 29/0308 585/324 |

* cited by examiner

US 9,896,628 B2

MESOPOROUS COMPOSITE OF MOLECULAR SIEVES FOR HYDROCRACKING OF HEAVY CRUDE OILS AND RESIDUES

CROSS-REFERENCE TO RELATED APPLICATION

This application claims the benefit and priority to Mexican application No. MX/a/2012/012877 with a filing date of Nov. 6, 2012, the disclosure of which is incorporated herein by reference in its entirely.

FIELD OF THE INVENTION

The present invention relates to catalysts for hydrotreating heavy crude oils and residues. More particularly, the invention relates to a composite catalyst support comprising composites of mesoporous materials, alumina and molecular sieves containing metals of groups VIB and VIII of the periodic table for use in the hydrocracking of heavy crude oils and residue and has particular application in the last bed of a multi-bed catalyst system for treating heavy crude oils and residues.

BACKGROUND OF THE INVENTION

Hydrotreating of heavy crude oils and residues is difficult due to the presence of refractory compounds of high molecular weight. Hydrotreating of heavy crude oils and residues depends on factors such as the catalyst used, the type of feed to be treated and the design of the reactors. In the hydrotreating process, the catalysts are designed to remove heteroatoms such as sulfur, nitrogen, and metals. The removed sulfur and nitrogen leave the system as gaseous products while metals are deposited irreversibly on the catalyst causing its permanent deactivation.

The design of catalysts for all reactions involved in heavy crude oil hydrotreating is a challenge because the large and complex molecules that contain the heteroatoms present diffusion problems in the pores of the catalyst and inhibit the adsorption of other reagents in its active sites. The task becomes even more problematic due to the presence of asphaltenes that cause the formation of coke deposits and deactivate the catalyst faster.

In general, the literature suggests the use of CoMo and NiMo catalysts supported on alumina.

The properties of the catalysts used depend on the type of feed to be processed. Operating conditions for heavy crudes are more severe than in the case of middle distillates where operating conditions are from moderate to low. Therefore, the catalysts chemical and physical properties, such as pore diameter, surface area, pore volume distribution, and surface acidity among others, must be different.

Currently, some hydrotreating processes in fixed bed reactors are using combinations of different catalysts and metal guard materials. These processes can contain several reactors including a guard bed reactor. Each reactor contains catalysts for different purposes. For example, in the literature it is claimed the use of a combination of more than ten catalysts. Some porous solids such as activated bauxite and alumina have been used as metal guards. Metals and clays present in the feed, cause a higher pressure drop during operation. This problem can be overcome by using a guard bed reactor.

There are patent documents which claim the use of Mo with Ni and/or Co. While others include the use of compounds of groups IA, IIA, VA, VIIA, IIB, IVB, VB, and VIIB using different types of oxides such as alumina, zeolites, silica, silica-alumina, titania, and/or combinations of them. Some of these patent documents are described below.

U.S. Pat. No. 6,399,530 discloses an amorphous silica/alumina with large surface area, and pore volume, and adequate silica content, to ensure the desired acidic function for chemical reactions. Silica/alumina is used as support in the preparation of the hydrocracking catalysts having high activity and selectivity towards middle distillates. The catalyst also contains metallic components and a modified ultrastable Y zeolite.

Likewise, U.S. Pat. No. 5,620,590 discloses a catalyst consisting of a combination of hydrogenating metals (Co—Mo, Ni—Mo, Ni—W, and Ni—W—Co), and alpha alumina with ultrastable Y zeolite with crystal size between of 0.1-0.5 micron, cell unit of 24.2-24.4 angstroms. The feeds used in the cracking process having an API gravity in the range of 22 to 31.9°.

U.S. Pat. No. 4,988,659 discloses the preparation of a catalyst composed of co-gels of silica/alumina with high surface area, which contributes to increase both, the activity and the octane number in gasoline. It also increases the production of light cycle oil, decreases the production of heavy cycle oil, and increases the quality of both. The co-gels can be combined with other components such as zeolites, sieves such as beta, SAPO's, ALPO's, etc. clays, modified clays, inorganic oxides, metals, coal, and organic substances, etc.

U.S. Pat. No. 4,894,142 discloses a catalyst which consists of a mixture of i) a hydrogenation metal of groups VI and VIII of the periodic table (Mo, W, Ni, Co), ii) a matrix of a refractory inorganic oxide composite silica-alumina (45-90%) and alumina (5-45%), iii) crystalline silicoaluminate (zeolite HY, 2-20%) with unit cell in the range 24.2 to 24.4 angstrom. The catalyst is highly selective to the conversion of heavy hydrocarbons to middle distillates in a temperature range of 149-371° C. The feeds used can be diesel, vacuum gas oils, demetallized products, atmospheric residue, de-asphalted vacuum residue, and bituminous oils. Preferably gas oil mixtures containing 50% volume of their components with boiling point above 371° C. These feeds contain nitrogen compounds usually present as organonitrogen compounds in amounts of 1 wppm to 1.0 wt %. They, also contain enough sulfur compounds to present sulfur contents greater than 0.15 wt %. The catalysts of this invention are characterized by having low acidity, measured by temperature programmed desorption of ammonia ($NH_3$-TPD), which in this case was 1.50.

On the other hand, U.S. Pat. No. 4,818,739 discloses the use of hydrocracking catalysts for feeds with a boiling point between 198.7 to 347.7° C. The catalysts are comprised of at least one non-zeolitic molecular sieve (NZ-MS) for the hydrocracking process based on silicoaluminophosphates like SAPO, ELAPSO, MeAPO, FeAPO, TiAPO, FCAPO, and ELAPO. At least one zeolitic aluminosilicate, which may consist of a Y zeolite, ultrastable Y zeolite, X zeolite, beta zeolite, KZ-20 zeolite, faujasite, LZ-210, LZ-10, ZSM, and a mixture of them containing (0.1 to 20 wt %) rare earths of the groups IIA, IIIA, IIIB, and VIIB or mixtures of them. Besides, at least a matrix of a refractory inorganic oxide, which may be clays, silicas, aluminas, silica-alumina, silica-zirconia, silica-magnesia, alumina-boria, alumina-titania, and a mixture of them. Also, a hydrogenating component added by impregnation, which can be cobalt, nickel, and/or molybdenum. The products of this process are characterized for having a high ratio of iso-paraffins/n-paraffins U.S. Pat. No. 4,689,137 discloses a catalyst composed of a crystalline aluminosilicate (Y zeolite), with silica/alumina ratio above 6.2, in combination with a refractory porous inorganic oxide. The Y Zeolite contains rare earths and noble metals (Group VIII), which are incorporated using the ion exchange method. The combination of zeolite and refractory oxide contains from 4.5 to 6.9 wt % of water, which is necessary thus the catalyst exhibits a high activity in the hydrocracking reactions. The Y zeolite used as part of the catalyst was prepared by ammonium exchange with a solution of ammonium fluorosilicate.

U.S. Pat. No. 4,604,187 discloses a catalyst containing a Y zeolite. The Y zeolite was prepared by exchanging a sodium zeolite with cations of one or more rare earth elements, followed by calcination, ammonia exchange and ion exchange of cations of noble metals of Group VIII. The resulting zeolite is not only highly active to promote catalytic hydrocracking reactions but also after the reaction it can be regenerated by coke combustion.

U.S. Pat. No. 4,422,959 relates to the preparation of a catalytic composite comprising a silica-alumina support with silica content of 20 to 80 wt %. In combination with nickel and vanadium compounds of a concentration in the range of 0.1-10 wt %. The feed used are hydrocarbons or mixtures of hydrocarbons that are in a range of boiling temperatures of 200-650° C. It can also be used hydrocarbons from tar sands.

U.S. Pat. No. 4,419,271 relates to a hydrocracking process with a catalyst. The hydrocracking catalyst improves the activity, selectivity and stability producing middle distillates from heavy gas oils. The catalyst comprises hydrogenation compounds such as metals of groups VIII mainly cobalt or nickel in combination with Group VI metals such as molybdenum or tungsten sulfides on a refractory oxide support such as alumina, magnesia, silica-alumina, and zeolite-type crystalline aluminosilicate with high cracking activity such as Y zeolite or rare earths-exchanged Y zeolite. They also have excellent activity for hydrodenitrogenation and hydrodesulfurization.

U.S. Pat. No. 4,111,846 discloses the preparation of inorganic hydrosols, particularly titania-alumina-silica hydrosols that serve as binders for catalytic compositions. The composition of the catalysts for the conversion of hydrocarbons finally comprises inorganic materials such as clays, and crystalline aluminosilicates known as zeolites, aggregates of discrete particles in the range from 20 microns to 6 mm in size. These catalysts may have a porous structure that allows the reactant molecules to enter into the catalyst particles. At the same time the catalyst particles have the physical strength and density characteristics that allow its use in commercial processes.

U.S. Pat. No. 3,304,254 discloses the improvement of a hydrotreating catalyst, characterized by a physical mixture of (1) a crystalline aluminosilicate with low sodium content (<4%), and (2) a hydrogenation component which comprises, in greater proportion, a porous support (crystalline aluminosilicate), and in lower proportion a component exhibiting hydrogenation activity such as elements of groups VI and VIII of the periodic table, especially Co (1-8 wt %) and $MoO_3$ (3-20 wt %). The high molecular weight hydrocarbons or a hydrocarbon mixture, for example, a petroleum fraction is subjected to cracking in the presence of hydrogen and catalyst. This process is carried out at temperatures in the range 427-593° C. This process has the disadvantage of producing large amounts of dry gas and an excess of butane.

U.S. Pat. No. 3,459,680 relates to a process to convert organic compounds in the presence of acidic catalytic sites. Such conversion processes include hydrocracking, alkylation, isomerization, polymerization, etc. This process relates to an improved composite, which comprises a crystalline aluminosilicate with an ordered structure with three-dimensional network characterized because the pores have a uniform diameter in the range of 4 to 15 angstroms. The remaining composite is comprised of a crystalline aluminosilicate, but it may be non-porous or catalytically inert. The rest of the remaining composite also contains a porous material. The composite is prepared by mechanical mixing. These catalysts have attrition resistance, activity, selectivity, and stability for steam deactivation.

U.S. Pat. No. 3,969,222 relates to a hydrotreating process (hydroprocessing) of hydrocarbons or mixtures of them, using a catalytic composite of a porous material, a component of palladium or platinum, a component of iridium and a component of germanium. The composite comprises a crystalline aluminosilicate. This process also is directed to the hydrogenation of aromatic rings, ring opening of cyclic hydrocarbons, desulfurization, denitrogenation, hydrogenation, etc. This process consists of two stages; the catalyst is for the second stage where the feed used already passed through the first stage.

SUMMARY OF THE INVENTION

The present invention involves the discovery and production of a hydrocracking catalyst having a composite support comprising mesoporous material.

According to a preferred embodiment of the present invention, the composite catalyst support comprises mesoporous silica, SBA-15.

According to another embodiment of the invention, the composite catalyst support of the present invention comprises alumina/molecular sieve/SBA-15, preferably boehmite/zeolite/SBA-15.

According to a further embodiment of the invention, the composite support of the present invention is formulated with metals of Groups VIB and VIII of the periodic table to form a catalyst useful for hydrocracking of heavy crude oils and residues.

According to still another embodiment of the present invention, the composite support of the present invention is formulated with metals of Groups VIB and VIII of the periodic table to form a catalyst used for hydrocracking of heavy crude oils and residues, particularly in the last bed of a multi-bed catalyst system.

With this invention it is possible to obtain a catalyst for use mainly in the last bed of a multi-bed system in one or more fixed bed reactors in a process for hydrotreating of heavy crude oils and residues.

The present catalyst composite support is particularly useful in the third bed of a fixed bed reactor in a process for hydrotreating heavy crude oils and residues, especially to increase the production of middle distillate and to improve hydrodesulfurization (HDS), hydrodenitrogenation (HDN), hydrodeasphaltenization (HDA's), and hydrodemetallization (HDM) conversions.

This invention comprises a catalyst with physical, chemical and textural properties that is primarily used in hydrotreating of heavy crude oils and residues increasing the production of middle distillates.

Finally, with the present invention a catalyst is obtained for use mainly in the third bed of a fixed bed reactor for hydrotreating heavy crude oils and residues, with hydrogenating power, moderate to low acidity, in addition it has good activity, stability and minimum deactivation in long time-on-stream.

BRIEF DESCRIPTIONS OF THE DRAWINGS

In order to have a better understanding of the evaluation of the catalysts presented in the examples of the present invention, used mainly in the last bed of a multi-bed reactor system or a series reactors for hydrotreating heavy crude oils and residues reference is made to the following Figures.

DETAILED DESCRIPTION OF THE INVENTION

Figure 1:
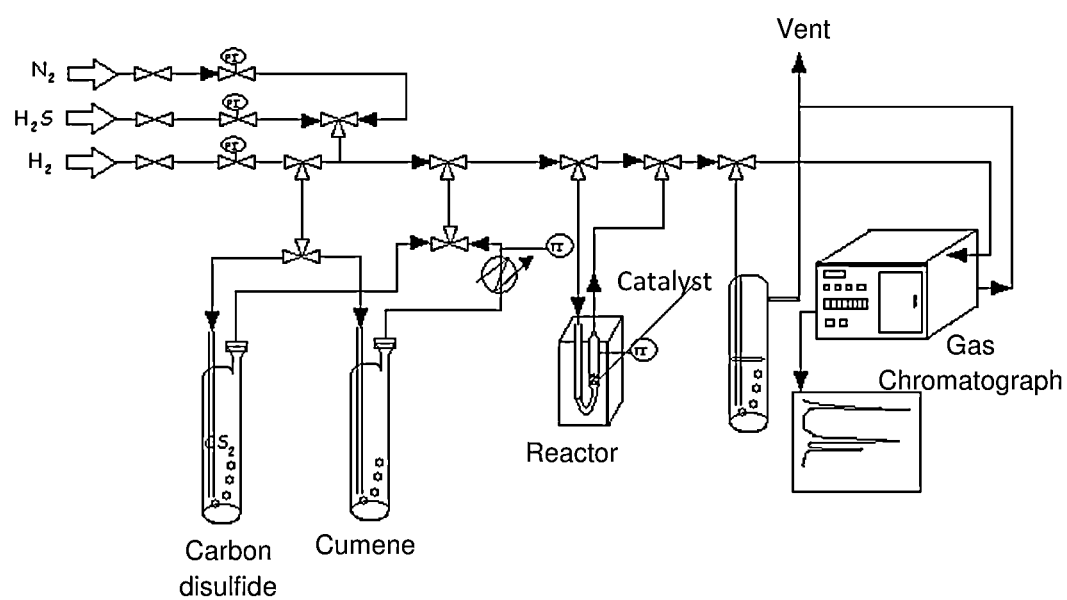
FIG. 1 is a schematic representation of the micro-reactor used to evaluate the cumene hydrocracking reaction over the catalysts obtained by the present invention.

Hydrodemetallization catalysts must have large pore diameters and pore volume to provide a high storage capacity for metals.

After the hydrodemetallization catalyst, there must follow a catalyst for hydrodemetallization/hydrodesulfurization reactions in order to obtain greater reduction of metals and some sulfur reduction in the original feed. The pore size distribution of this catalyst should be divided into two ranges, large pore diameters to remove metals, and intermediate pore diameters for removing refractory sulfur compounds.

A third catalyst or groups of catalysts are the catalysts for hydrodesulfurization/hydrocracking that can be placed after the hydrodemetallization catalyst or after the hydrodemetallization/hydrodesulfurization catalysts. The main properties of these catalysts are large specific surface area and high reaction rate in hydrodesulfurization, hydrocracking or hydrodenitrogenation The present invention involves the use of metals of groups VIB and VIII of the periodic table supported on composite mesoporous materials, molecular sieves, alumina, and adding additives of Groups IVA and VA.

Recently a new family of mesoporous materials of silica have been discovered called SBA-15, similar to the MCM-41 but with a considerably larger pore wall thickness (3-6 nm). These materials are synthesized using an organic surfactant, which is commercially cheap, available and biodegradable. Around this material, the inorganic silicate molecules, typically present in the reaction mixture with acidic pHs≤1, are organized. When the organic component is extracted, the remaining inorganic solid has a hexagonal arrangement with pore diameters between of 6 to 12 nm, specific surface area around 600 to 1000 m$^2$/g and pore volume of 0.8 to 1.3 cm$^3$/g.

SBA-15 is chemically inert because it is formed by pure $SiO_2$, limiting its application as a catalyst or catalyst support. However, the physical and chemical properties of the surface can be modified by depositing on the surface metal oxides of group IIIA such as aluminum or group IV like titanium or zirconium, etc. This modifies the surface acidity and provides new chemical surface properties, while preserving the textural properties of this material making it more attractive as a support for catalysts.

Molecular sieves, which can be zeolites, contain in their structure silicon, aluminum, sodium, hydrogen, and oxygen.

Recently, ultrastable materials MSAMS-2 have been obtained using SBA-15 as a template or rigid structure-directing agent. Nuclear magnetic resonance (NMR) confirmed the increment in the condensation of silanol groups by increasing the ratio $(SiO_2)^4/(SiO_2)^3$ [$Q^4/Q^3$]. The hydrothermal stability depends on the formation of zeolite subunits and the insertion of structural atoms of aluminum in the mesoporous material. Furthermore there is an increment in wall thickness.

The physical mixture of alumina and zeolite is an excellent support for NiMoS catalysts, which show high activity for hydrodesulfurization (HDS) of refractory sulfur species. The catalyst also has high resistance to poisoning by hydrogen sulfide (H2S). However, the excessive cracking of the feed and deactivation of the zeolite are mainly due to the high acidity of these materials. Strong acidity in HDS catalysts improves hydrodesulfurization of refractory sulfur compounds, substituted dibenzothiophenes, with alkyl groups at positions 4 and 6, minimizing steric effects and increasing the hydrogenation of the aromatic rings in the neighborhood of the sulfur. Besides, zeolites as strong acid supports appear to increase the release of hydrogen sulfide in the sulfided catalysts by weakening the metal-sulfur bond; this function causes a high tolerance for H$_2$S. The alumina-zeolite supports in NiMo catalysts show high hydrodesulfurization activity in refractory compounds in the presence of 1.67% $H_2S$ in $H_2$. Pure zeolite can hydrodesulfurize dibenzothiophene (DBT) through the direct elimination of the sulfur atoms or by the hydrodesulfurization-hydrogenation route. Therefore, the cracking capability of the alumina-zeolite supports in the supported catalysts is due to effect of the zeolite.

A balance between acidity, porosity of the substrate, and the active phases must be found. According to the present invention, the mesoporous composites, which involve mechanical mixtures of different materials, provide this balance.

The hydrocracking catalyst of the present invention comprises at least a metal of groups VIB and VIIIB of the periodic table of elements supported by composites of mesoporous materials, molecular sieves and alumina, containing additives of the groups IVA and VA. This catalyst has suitable hydrogenating ability and moderate acidity, as well as an average pore diameter of 6.0 to 15.0 nm and a percentage of pores with diameters ranged 5-50 nm between 74.0-85.0%, for carrying out the hydrocracking of a hydrocarbon feedstock, such as, asphaltenes and removing sulfur, nitrogen and metals compounds from asphaltenic molecules, which allows the catalyst to increase the conversion of all reactions (HDS, HDM, HDN, HDA's) when the reaction temperature increase from 360 to 410° C. Additionally the API gravity of the feedstock will increase from the original value of 4.4° API to 12.6° API and 19.4° API in the products at 360 and 410° C., respectively, namely, increments of 8.2 to 15° API.

The catalyst support of the present invention is a composite of alumina molecular sieve mesoporous material. Preferably, the composite support is formed of a mechanical mixture boehmite, zeolite and SBA-15, which can be used in a ratio in the range of 60 to 85, 5 to 15, 10 to 35, each ratio in percent by weight, respectively. An especially preferred ratio is 70:10:20 wt %. The support can be prepared, for example, by mechanical blending a commercial boehmite (Catapal C-1), zeolite and SBA-15, peptizing the mixture with nitric acid (10 vol %). The peptized mixture is then extruded to a size of 1/16 in, dried at room temperature for 12 hours; then dried in an oven at 120° C. for 3 hours, and, then calcined at 550° C. for 4 hours (heating at 2° C./min).

Aluminas in addition to boehmite. Include aluminum precursor salts as anhydrous $AlCl_3$ [Ryoo R, et al. *J. Chem. Commun* (1997) 2225], aluminum isopropoxide in non-aqueous solutions [Bagshaw, S. A. et al: *Chem. Commun.* (1996) 2209] or sodium aluminate in aqueous solution [Hamdam H. et al. *J. Chem. Soc. Faraday Trans.* 92 (1996) 2311. Suitable zeolites (crystalline molecular sieves) include Y zeolite [Kunisada, N. et al. *Appl. Catal.* 269 (2004) 43. USY zeolite, ZSM5 [Kloestra, et al. *Chem. Commun.* (1997) 2281]. All of the foregoing articles are hereby incorporated by reference in their entirety.

The composite mesoporous support of the present invention can be utilized with any suitable metal of Group VI B and Group VIII of the periodic table. Suitable Group VI B metals include molybdenum, tungsten, [P. Rayo, et al. *Petroleum Science and Technology* 25 (2007) 215; P. Rayo, et al. *Fuel* 100 (2012) 34; Mohan S. Rana, et al. *Fuel* 86 (2007) 1254; Mohan S. Rana, et al. *Catal. Today* 107-108 (2005) 346, Mohan S. Rana, et al. *Catal. Today* 109 (2005) 61; Jorge Ramirez, et al. *Catal. Today* 109 (2005) 54, Samir K. Maity, et al. *Catal. Today* 109 (2005) 61; F. Trejo, et al. *Fuel* 100 (2012) 163; B. Caloch, et al. *Catal Today* 98 (2004) 91]. Suitable Group VIII metals include nickel, cobalt [P. Rayo, et al. *Petroleum Science and Technology* 25 (2007) 215; P. Rayo, et al. *Fuel* 100 (2012) 34; Mohan S. Rana, et al. *Fuel* 86 (2007) 1254; Mohan S. Rana, et al. *Catal. Today* 107-108 (2005) 346, Mohan S. Rana, et al. *Catal. Today* 109 (2005) 61; Jorge Ramirez, et al. *Catal. Today* 109 (2005) 54, Samir K. Maity, et al. *Catal. Today* 109 (2005) 61; F. Trejo, et al. *Fuel* 100 (2012) 163; B. Caloch, et al. *Catal Today* 98 (2004) 91]. All of the foregoing articles are hereby incorporated by reference in their entirety.

Additives including metals of Group IVA and Group VA may be used as Si, and P, etc. [P. Rayo, et al. *Petroleum Science and Technology* 25 (2007) 215; Samir K. Maity, et al. *Catal. Today* 109 (2005) 61; Mohan S. Rana, et al. *Appl. Catal.* 425-426 (2012) 1]. All of the foregoing articles are hereby incorporated by reference in their entirety.

For example, the composite mesoporous support of the present invention may be impregnated with a solution of ammonium heptamolybdate and nickel nitrate to obtain a concentration of Mo and Ni of 10 and 2.6 wt %, respectively and extruded. The extrudates may be allowed at rest for 12 hours at room temperature, then dried at 120° C. for 3 hours and calcined at 450° C. for 4 hours.

The catalyst of the present invention has, for example, a low to moderate total acidity at 100° C., equivalent to 180 to 360 micromoles of pyridine per gram of catalyst, a specific surface area of 150-300 $m^2/g$, an average pore diameter of 6.0 to 15.0 nm, and a pore volume of 0.2 to 0.7 $cm^3/g$. Likewise, the present catalyst may have the following pore distribution: less than 20% of its pore volume of pores having a diameter of 5 nm or less, 70 to 85% of its pore volume of pores having a diameter of 5 to 50 nm, and less than 5% of its pore volume in pores with diameter greater than 50 nm. In one embodiment, the catalyst has 20% of its pore volume having a pore diameter of 0 to 5 nm.

The catalyst of the present invention can be "tailored" or designed for use in the last bed of a multi-bed system, particularly where the feed stream flows downwards. The contact area between the catalyst and feed is improved in downflow mode. By using feed distributors at the top of the reactor, the liquid distribution over the catalyst bed is enhanced. The feed that the catalyst processes in this invention contains lower amounts of metals and it is lighter than the stream which is fed to the first bed.

The catalyst developed in this invention is dual-functional, and behaves differently depending on the reaction temperature. In this regard, there are two important zones of reaction, one at temperatures below 400° C. (360-380° C.) and other at temperatures greater than or equal to 400° C. In the zone of 360-380° C. the catalyst has hydrogenating power and low to moderate acidity for breaking high molecular weight molecules. However, when operating at temperatures above 400° C., where cracking is mainly thermal, the catalyst has a high percentage of pores with diameters in the range of 10-50 nm to allow the reactions of hydrodemetallization, hydrodeasphaltenization, and hydrodesulphurization where asphaltenic sulfur is present.

The catalyst of the present invention is particularly useful in the third bed (hydrodesulfurization/hydrocracking) of a reactor or a system of fixed bed reactors for hydrotreating heavy crude oils and residues, and can be designed to increase the production of distillates in the temperature range of 204° C. to 538° C., and also for decreasing the production of vacuum residue (538° C.+). The feedstock to be processed contains low amounts of metals and is lighter than the feedstock which is fed into the first bed. This catalyst has high hydrogenating power, low to moderate acidity and intermediate pore diameter (higher percentage of pores in the range of 10-50 nm) for removing sulfur compounds from asphaltenic molecules. This feedstock is also constituted of heavy hydrocarbons, asphaltenic compounds, and asphaltenic sulfur, nitrogen, and metals (nickel and vanadium). The present invention relates to a synthesis of catalysts for the hydrotreating of heavy crude oils and residues, coming from previous hydrotreating in catalytic beds.

Thus, the present invention is preferably directed to a catalyst to be used in the third bed (hydrodesulfurization/hydrocracking) in a fixed bed reactor in a process for hydrotreating of heavy crude oils and residues, which were treated in a previous catalytic bed(s). The catalysts of the present invention are used to increase production of distillates with boiling temperatures among 204-538° C., and decrease production of vacuum residue (538° C.+), and primarily reduce the content of sulfur, while simultaneously other reactions are performed such as HDM, HDN, and the HDA's, to produce a light crude oil and increase the production of the hydrocarbon fraction in the range of <204° C. (gasoline).

The present invention constitutes an improvement over previous catalyst systems because the present catalyst has particular use in the last bed (hydrodesulfurization/hydrocracking) of a multi-bed system following hydrodemetallization and/or hydrodemetallization/hydrodesulfurization and can increase the production of distillates with a boiling range from 204 to 538° C., decrease the production of vacuum residue (538° C.+) and increase the gasoline fraction (<204° C.). The product of the last bed, which is a feed for further processing, such as reforming, contains lower amounts of metals and is lighter than the stream which is fed to the first bed because in the preparation of the supports for the catalyst of the last bed, elements of Groups III A and IV A forming mesoporous composites can be used resulting in a catalyst having the features of: a low to moderate total acidity at 100° C., 180 to 360 micromoles of pyridine per gram of catalyst, a specific surface area of 150-300 m²/g, an average pore diameter of 6.0 to 15.0 nm, a pore volume of 0.2 0.7 cm³/g, and the percentage of pores in the range of 5-50 nm between 74-85% to carry out the hydrocracking of asphaltenes and to remove sulfur, nitrogen, and metals compounds from asphaltenic molecules, with low metal content 1-5 wt % for elements of group VIIIB and 3-15 wt % of group VIB.

As indicated, temperature conditions used for hydrocracking in the hydrocracking process of the present invention determine the behavior of the catalyst. Thus, one behavior at temperature less than 400° C. (360-380° C.) and another behavior at temperature ≥ to 400° C. If the hydrocracking reaction or last bed of a multi-bed catalyst operation is conducted at a temperature between 360 and 380° C., the catalyst has hydrogenating ability and low to moderate acidity to perform the cracking of molecules with high molecular weight. However, if a temperature ≥ to 400° C. is used, the cracking is primarily thermal. Likewise, if the purpose is to assure the enhancement in the conversion of all the reactions (HDM, HDN, HAD's) temperature should be increased, for example, from 360 to 410° C.

The process for hydrocracking of heavy crude oil or residues can be carried out in a multistage or multizone fixed bed reactor. The initial stage or stages include have as their purpose the reduction of the content of impurities such as organometallic, sulfur and nitrogen compounds, and on the other hand reducing viscosity and increasing the API gravity of the feedstock, prior to the last stage or zone, where the SBA-15 supported hydrocracking catalyst of the present invention is utilized in accordance with the present invention. Such multi-stage treatment of heavy crude, including process conditions and catalysts used in the first, intermediate and final stage(s) or zone(s) for catalytic treatment of heavy crude oil is discussed in detail in U.S. published Application No. 2013/0056394 to Ancheyta Juarez et al, the disclosure of which is hereby incorporated by reference in its entirety.

Thus, the initial and/or intermediate stage or stages include a catalyst to hydrodemetallize or hydrodemetallize/hydrodesulfurize the heavy crude oil or residue using a catalyst having a support different from the last stage or zone in which the SBA-15-supported catalyst is used. The catalyst in the pre-hydrocracking stage or stages can be a NiMo on alumina, for example. The demetallized, desulfurized heavy crude oil from such first and/or intermediate stages is fed to the last stage(s) or zone(s), where it contacts a NiMo-impregnated alumina-molecular sieve-mesoporous silica material of the present invention. Thus, the feed to the last stage may be characterized as a demetallized, desulfurized heavy crude or residue.

The present cracking catalyst can be used in the last bed of a multi-bed system to improve the production of intermediate distillates from heavy crude oils or residues so as to increase the API gravity from 4.4° in the feedstock to 12.6° and 19.4° in the product at 360 and 410° C., respectively, i.e. increments of 8.2° to 15° API. Likewise, it can be designed to improve the production of intermediate distillates to obtain an increase in the yield of:
a) the 343-454° C. fraction (straight run heavy gasoil and light vacuum gasoil) from 2 to 10.5 wt %;
b) the 204-274° C. fraction (Jet fuel) from 1.4 to 8.5 wt %;
c) the 274-316° C. fraction (kerosene) from 1.3 to 5.1 wt %;
d) the <204° C. fraction (gasoline) from 0.4 to 3.4 wt %;
e) the 316-343° C. fraction (straight run heavy gasoil) from 0.8 to 3.2 wt %;
f) the 454-538° C. fraction (heavy vacuum gasoil) from 0.8 to 2.3 wt %; and
g) the vacuum residue (>538° C.) depending on the reaction temperature, rendering 6.74% at 360° C. and 33% at 410° C.

The feedstocks to be treated with the catalyst of the present invention located in the third bed of a multi-bed system could contain from a small amount of metal up to 700 wppm of the total amount of nickel and vanadium, up to 10 wt % of asphaltenes, and sulfur content within the range from 0.5 to 5 wt %.

The following examples describe how to obtain the catalyst with properties suitable for use primarily in the third bed for hydrotreating heavy crude oils and residues.

EXAMPLES

The following examples are presented to illustrate the performance of the catalysts of the present invention and their use in the hydrotreating of heavy crude oils and residues. These examples should not be considered as limiting of the present invention, because they simply illustrate different procedures for the preparation of the support, the application of the catalyst with this type of feedstock, as well as the operating conditions.

Example 1

In the preparation of the supports for the prototype of this Example 1 was used commercial boehmite, tetraethyl orthosilicate (TEOS) from Aldrich, and mesoporous material (SBA-15) synthesized in the laboratory.

For the preparation of the supports of the present example we used boehmite as binder.

For the synthesis of support for prototype 1 (Prot-1), boehmite was used as starting material wherein to a portion of the total boehmite (10%) used as a binder was added the required amount of nitric acid ($HNO_3$) at 10 wt % to peptize it, then gradually the rest of the boehmite (90 wt %) and deionized water were added, until achieving a homogeneous paste with the right consistency to extrude and get extrudates of ⅒ inch in diameter. The extrudates were aged from 12 to 18 h, dried at 100-120° C. for 2-6 h, and subsequently calcined using a temperature ramp of 2° C./minute up to 500-550° C., maintaining the last temperature for 4 hours to obtain an alumina support in its gamma phase.

For the synthesis of the support for prototype 2 (Prot-2) similar procedures as for the synthesis of Prot-1 were applied, with the difference that to 90% by weight of the boehmite the required amount of tetraethyl orthosilicate (TEOS) was added to obtain 5 wt % of silicon on the calcined material ($SiO_2$—$Al_2O_3$).

In the synthesis of the support of prototype 3 (Prot-3), to the γ-alumina support obtained in the synthesis of Prot-1, the required amount of TEOS was added by wetness incipient method to obtain 5 wt % of silicon. The extrudates were aged from 12 to 18 h, dried at 100-120° C. from 2 to 6 h, and subsequently calcined with a temperature ramp of 2° C./minute up to 500-550° C., and maintaining at this temperature for 4 hours to obtain a support of $SiO_2/Al_2O_3$.

In the synthesis of the support of prototype 4 (Prot-4), first SBA-15 was synthesized according to the procedure published by Zhao et al. (1998) described in Dongyuan Zhao, et al. (1998). "Triblock Copolymer Syntheses of Mesoporous Silica with Periodic 50 to 300 Angstrom Pores". *Science* 279 (5350): 548. In a glass reactor 8 g of Pluronic 123 (Aldrich) were dissolved in 160 g of acid (HCl) 2N [82 mL of HCl (Fermont, purity 37%) in a 500 mL volumetric flask with constant stirring at a temperature of 40° C. during 3 h. Maintaining constant both temperature and agitation 17.6 g of TEOS (Aldrich, purity 99%) were added dropwise, afterwards 40 mL of deionized water were added dropwise, the system was capped and closed. The reaction was carried out at 40° C. with constant stirring during 20 h.

The reaction product was transferred to a Teflon bottle, which was perfectly closed, and was put into an oven at 100° C. during 48 h. The product was cooled, filtered under vacuum and washed with about 3 liters of water to remove excess of surfactant. The solid obtained was placed in a desiccator and then calcined at 500° C. during 6 h using an initial heating rate of 0.5° C./minute to obtain the SBA-15.

Later a support was prepared with 80/20 wt % ratio of $Al_2O_3$-SBA-15 by mixing mechanically boehmite Catapal C-1 and SBA-15. This solid mixture was peptized with nitric acid in concentration of 10 vol %, and was extruded in the form of cylinders of 1.59 mm diameter and length in the range of 2 to 7 mm, dried at room temperature during 12 h followed by drying in an oven at 120° C. during 3 h, then calcined at 550° C. during 4 h using an initial heating rate of 2° C./minute.

The last four supports were impregnated with a solution of ammonium heptamolybdate and nickel nitrate to obtain a concentration of Mo and Ni of 10 and 2.6 wt %, respectively, the extrudates were aged during 12 hours at room temperature, then dried at 120° C. during 3 h and calcined at 450° C. during 4 h using a heating rate of 2° C./minute, obtaining the corresponding prototypes Prot-1, Prot-2, Prot-3, and Prot-4.

The textural properties of these four prototypes (Prot-1, Prot-2, Prot-3, and Prot-4) are shown in Table 1.

TABLE 1

Textural properties of the prototypes of Example 1

| Properties | Prot-1 | Prot-2 | Prot-3 | Prot-4 |
|---|---|---|---|---|
| SSA, $m^2/g$ | 162 | 189 | 151 | 276 |
| PV, $cm^3/g$ | 0.4 | 0.4 | 0.3 | 0.5 |
| APD, nm | 9.2 | 7.8 | 8.3 | 7.4 |
| PVD, % | | | | |
| <5, nm | 13.6 | 23.3 | 21.4 | 20.8 |
| 5-50, nm | 84.8 | 74.2 | 75.6 | 76.6 |
| >50, nm | 1.6 | 2.6 | 3.0 | 2.6 |
| Mo, wt % | 8.0 | 6.5 | 6.5 | 6.0 |
| Ni, wt % | 2.6 | 3.0 | 3.5 | 3.0 |

SSA = Specific surface area,
PV = Pore Volume,
APD = Average pore diameter,
PVD = Pore volume distribution.

On the other hand, a micro-reactor (FIG. 1) operating in a differential mode was used to measure the hydrocracking rate of cumene, which gives a relative measure of the acidity of these prototypes, using as reaction model the hydrocracking of cumene at reaction conditions of 400° C. and atmospheric pressure.

Figure 2:
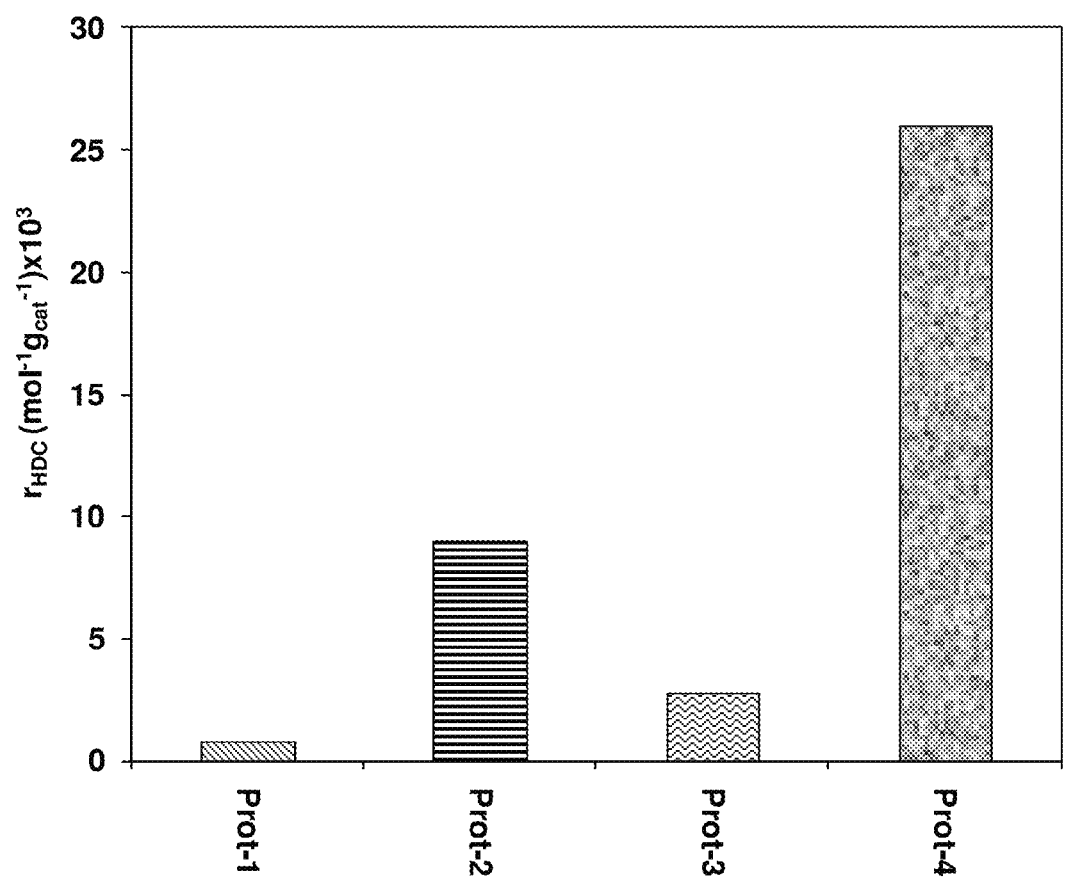
FIG. 2 shows the reaction rate of cumene hydrocracking.

The results of hydrocracking rate of cumene for each prototype are shown in FIG. 2. This figure shows that the prototype Prot-4, which contains SBA-15 as silicon source, has the highest acidity. Activity of these prototypes in the hydrocracking of cumene was: Prot-4>>>Prot-2>Prot-3>Prot-1.

Figure 3:
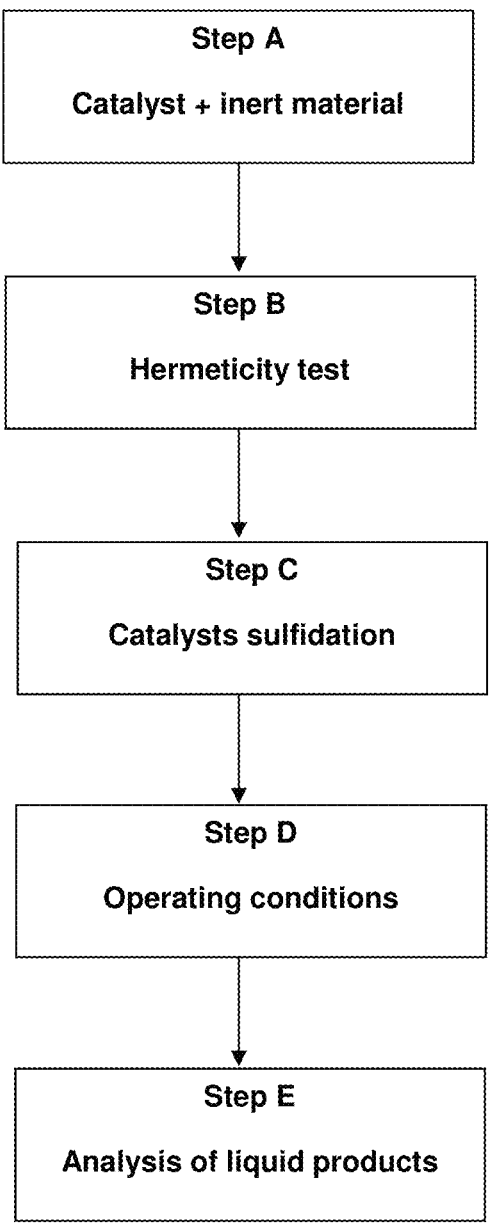
FIG. 3 shows the catalyst evaluation methodology of the present invention at microplant scale with light crude feed.

FIG. 3 shows the methodology used in the microplant scale evaluation of the catalysts of the present invention. The step A consists of loading the reactor with a uniform mixture of 10 mL of catalyst and 10 mL of silicon carbide (SiC) as inert material. The step B corresponds to hermeticity test at a pressure 10% greater than the operating pressure ($P=1.1P_{op}$). The Step C concerns the sulfidation of the catalyst, which was carried out with straight run gas oil from atmospheric distillation of crude oil, doped with dimethyl disulfide (DMDS) to obtain 1.0 wt % sulfur, at the following conditions: temperature of 320° C., pressure of 28 kg/$cm^2$, space velocity (LHSV) of 2.0 $h^{-1}$, hydrogen/hydrocarbon ratio of 2000 $ft^3$/bbl. Step D corresponds to the operation phase, that is performed with a feed into the reactor in upflow, the feedstock used is light crude oil 21.5° API.

Operating conditions in step D are the following: temperature of 380° C., pressure of 70 kg/$cm^2$, hydrogen/hydrocarbon ratio of 5,000 $ft^3$/bbl, and LHSV of 1.0 LHSV $h^{-1}$. In the step D the reaction is carried out during 120 h of time-on-stream and product samples are recovered each 12 hours. Finally, in step E, analysis of liquid products obtained is performed.

The conditions for evaluating microplant level catalysts are presented in Table 2.

TABLE 2

Operating conditions for catalyst evaluation at microplant level

| Variables | |
|---|---|
| Temperature, ° C. | 380 |
| Pressure, kg/$cm^2$ | 70 |

TABLE 2-continued

Operating conditions for catalyst evaluation at microplant level

| Variables | |
| --- | --- |
| $H_2$ flow, L/h | 12.4 |
| Feedstock flow, mL/h | 10 |
| LHSV, $h^{-1}$ | 1.0 |
| $H_2$/HC ratio, $ft^3$/bbl | 5000 |
| Operating mode | Upflow |
| Time-on-stream, h | 120 y 200 |
| Catalyst volume, mL | 10 |

Figure 4:
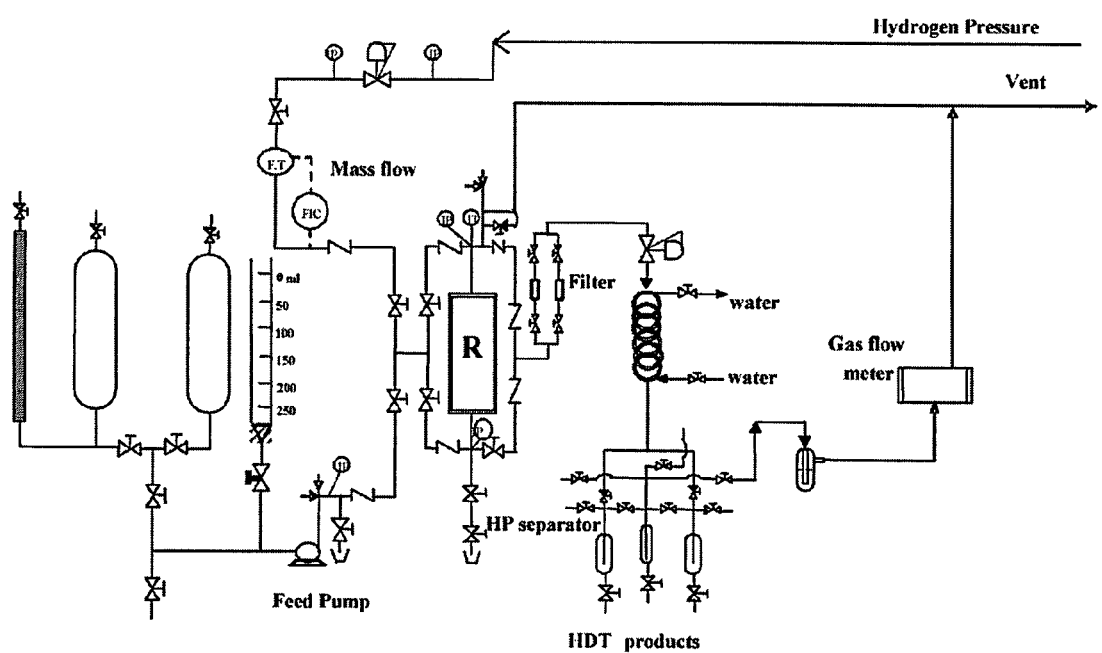
FIG. 4 is a representation of the microplant used in the evaluation of the catalysts obtained by the present invention.

FIG. 4 is a schematic representation of the equipment used to evaluate at microplant level each one of the catalysts obtained in the Examples of the present invention.

For the evaluation at microplant level of each prototype a light crude oil was used as feedstock, which contains 151 wppm of metals (Ni+V). The feedstock properties are shown in Table 3.

TABLE 3

Physical and chemical properties of the feedstock used to evaluate catalysts of example 1 at microplant scale

| Properties | |
| --- | --- |
| Density at 20° C., g/mL | 0.880 |
| API gravity | 37.1 |
| Conradson carbon, wt % | 5.4 |
| Nitrogen content, wt % | 0.18 |
| Sulfur content, wt % | 2.2 |
| Metals, wppm | |
| Ni | 26.2 |
| V | 124.8 |
| (Ni + V) | 151.0 |
| Asphaltenes, $nC_7$ insolubles, wt % | 8.43 |

Figure 5:
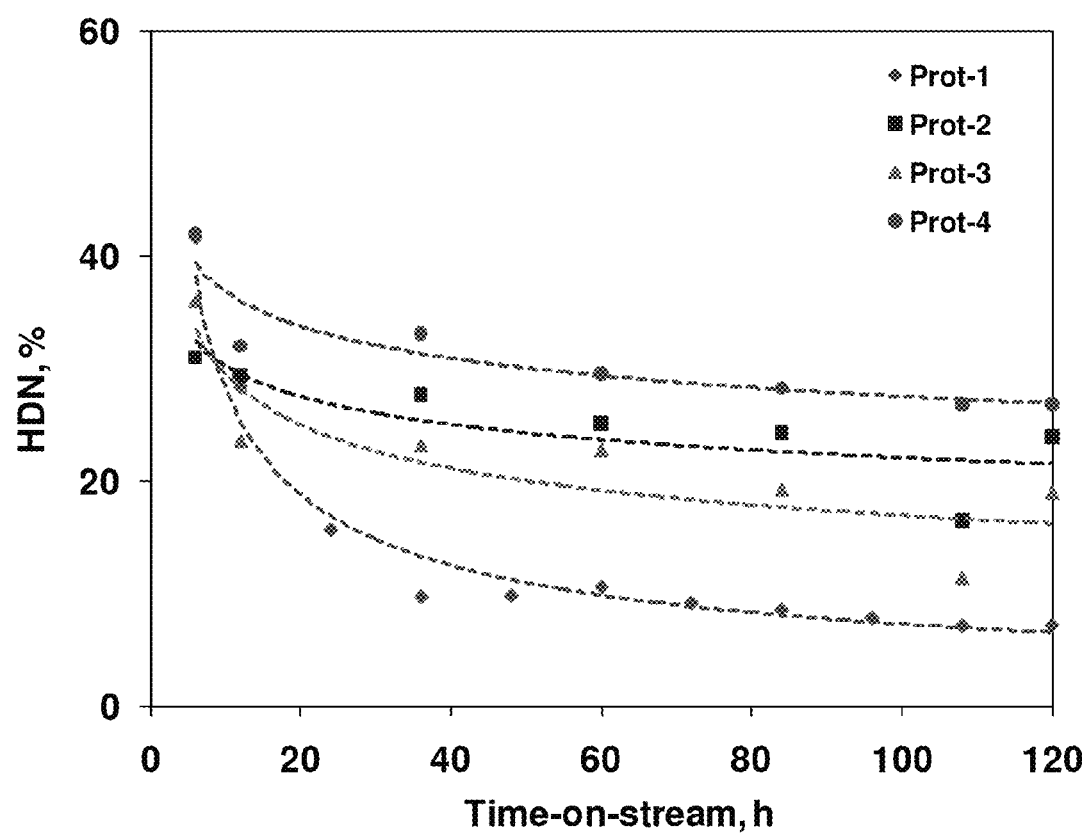
FIG. 5 shows hydrodenitrogenation conversion at time-on-stream of 120 h (Example 1)

The behavior of the prototypes in the HDN reaction is shown in FIG. 5, where Prot-4 prototype presented the highest activity and stability with an initial conversion of 42% at 6 h of reaction and HDN conversion of 27% at 120 h of reaction. Moreover, prototype Prot-1 was the one that deactivated faster. The order of activity of prototypes in the HDN reaction was the same as the acidity of the prototypes observed in the cumene hydrocracking reaction.

Figure 6:
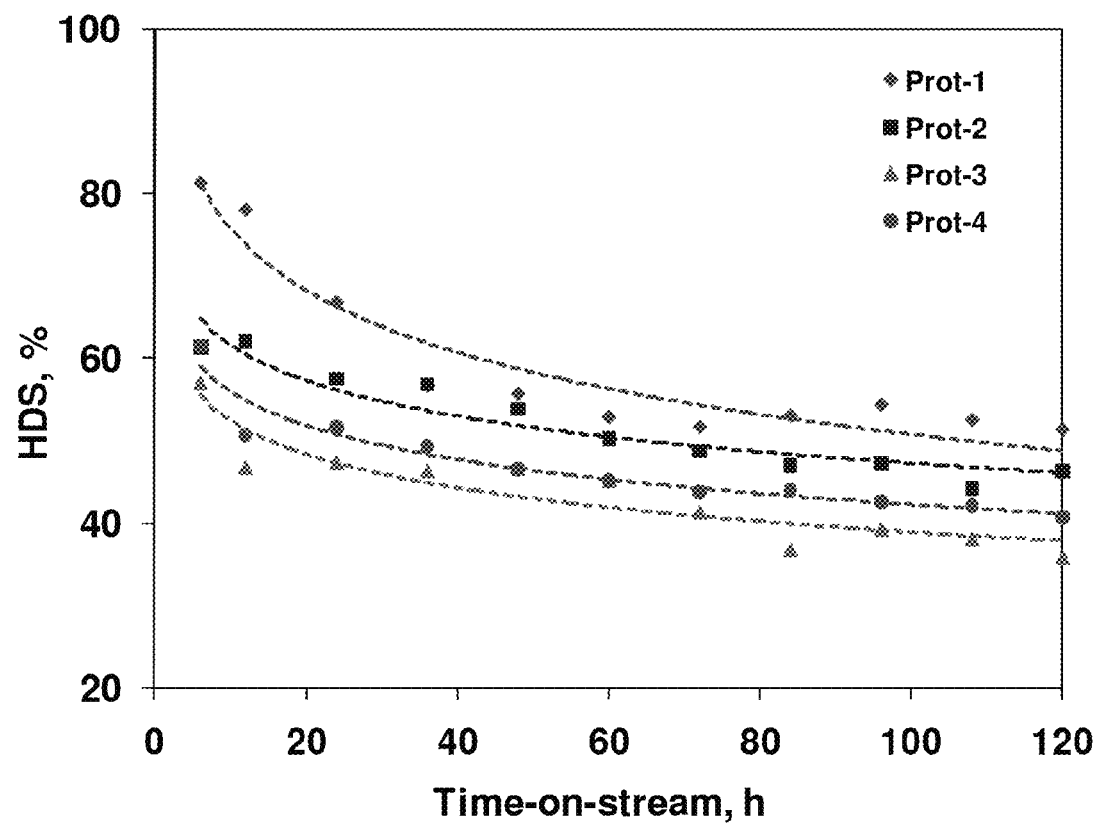
FIG. 6 shows hydrodesulfurization conversion at time-on-stream of 120 h (Example 1)

FIG. 6 shows the behavior of HDS reaction, where it is observed that although prototype Prot-1 has a higher initial activity, 81.4% HDS, its stability drops down 30% (end HDS 51.4%). Prototypes Prot-2, Prot-3, and Prot-4 with initial HDS conversions of 61.3, 57.0, and 61.5%, respectively, although they present a lower initial activity compared with Prot-1, they show a better stability, because the activity of only diminishes from 15 to 21%.

Figure 7:
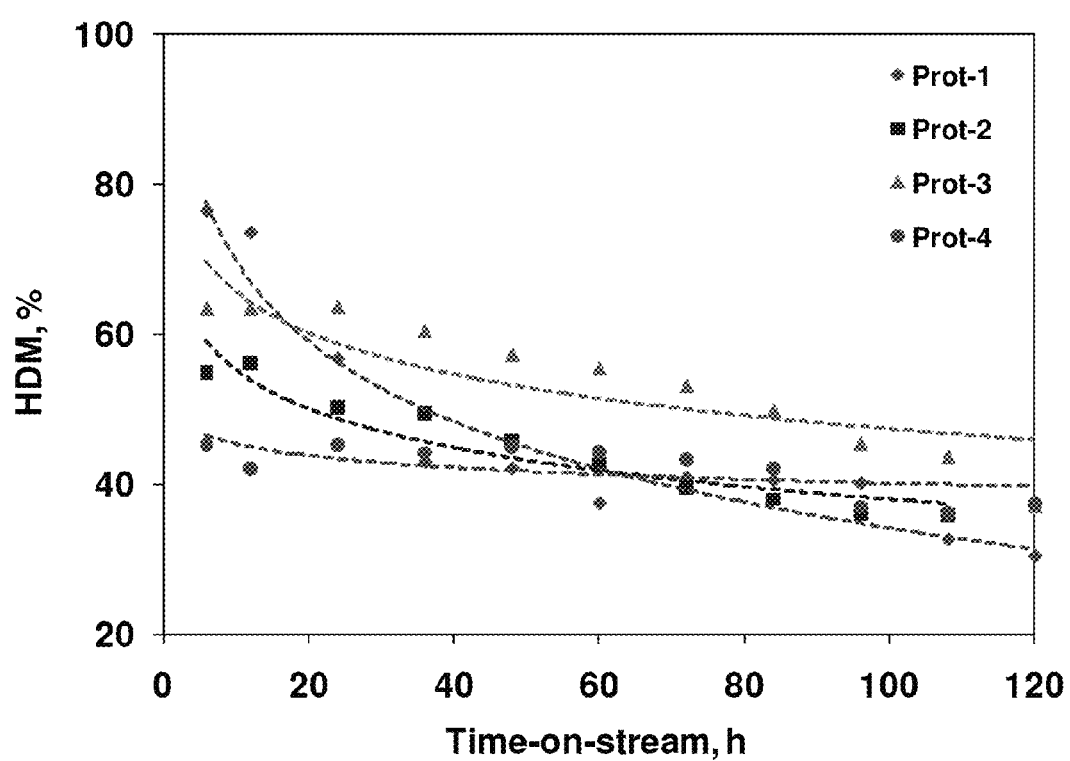
FIG. 7 depicts hydrodemetallization conversion at time-on-stream of 120 h (Example 1)

FIG. 7 shows the behavior of the four prototypes in the HDM reaction, where it is observed that Prot-1 presents a HDM deactivation of about 46% during 120 h time-on-stream. Regarding prototypes Prot-2 and Prot-3, the observed deactivation at the same operation time is 26 and 19%, respectively. Moreover, prototype Prot-4 is the one with the lowest HDM initial activity (45%) compared with the prototypes Prot-1, Prot-2, and Prot-3, however, its stability is higher during 120 h reaction decreasing its activity only 8%.

Figure 8:
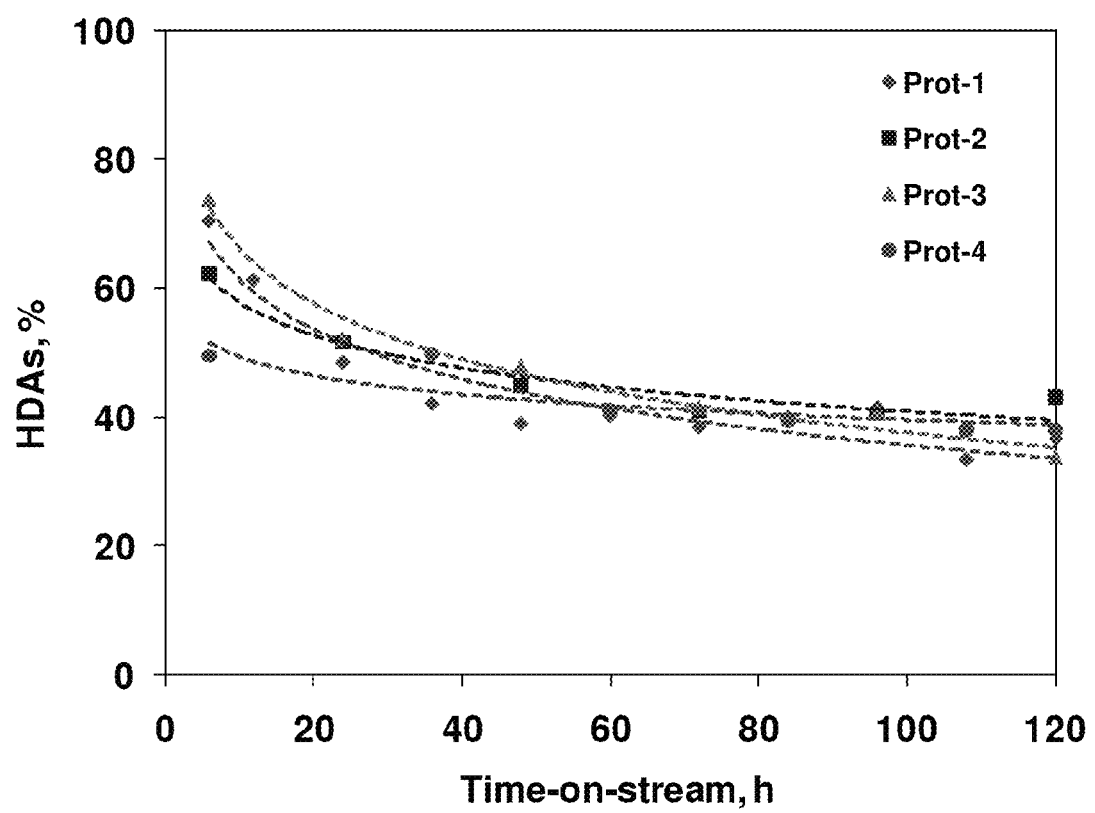
FIG. 8 depicts hydrodeasphaltenization conversion at time-on-stream of 120 h (Example 1)

The performance of the four prototypes on HDA's reaction is presented in FIG. 8, where it is observed that all prototypes have a moderate deactivation during 120 hours of reaction, prototype Prot-4 presented the lowest deactivation, followed by Prot-2, and finally Prot-3.

Example 2

In this example the same commercial boehmite Catapal C-1 and SBA-15 considered in Example 1 were used, besides zeolite Y (CBV-720) of the Zeolyst brand.

For the synthesis of support of prototype Prot-5, SBA-15, synthesized previously in Example 1, was modified with a solution of aluminum nitrate by the incipient wetness method, to obtain a support with 20 wt % of Al. This solid mixture was peptized with nitric acid at 10 vol % concentration, then was extruded to obtain extrudates of $\frac{1}{16}$ inch (1.59 mm) size, dried at room temperature (±20° C.) during 12, afterwards was put into an oven at 120° C. during 3 h, and finally calcined at 550° C. during 4 h (2° C./min).

For the synthesis of support of prototype Prot-6, a support with $Al_2O_3$-SBA-15-zeolite ratio of (70-20-10 wt %, respectively) was prepared by a mechanically mixing a mixture of commercial boehmite (Catapal C-1), SBA-15, and zeolite. This solid mixture was peptized with nitric acid of 10 vol % concentration, then was extruded to obtain extrudates of $\frac{1}{16}$ inch size, after was dried at room temperature (±20° C.) during 12 h, then was put into an oven at 120° C. during 3 h, finally was calcined at 550° C. during 4 h (2° C./min). The supports were impregnated with Mo and Ni with the same route and the same content as in Example 1. The catalysts obtained in this Example 2 are the prototypes Prot-5 and Prot-6.

Textural properties of these prototypes are shown in Table 4. This table also includes the properties of Prot-4 of Example 1.

TABLE 4

Textural properties of the catalysts of Example 2

| Properties | Prot-4 | Prot-5 | Prot-6 |
| --- | --- | --- | --- |
| Density, g/mL | 0.70 | 0.66 | 0.71 |
| SSA, $m^2$/g | 276 | 220 | 331 |
| PV, mL/g | 0.5 | 0.4 | 0.5 |
| APD, nm | 7.4 | 7.7 | 6.6 |
| PVD, % | | | |
| <5, nm | 20.8 | 18.7 | 20 |
| 5-50, nm | 76.6 | 79.8 | 78.7 |
| >50, nm | 2.6 | 1.5 | 1.3 |
| Mo, wt % | 6 | 6 | 7 |
| Ni, wt % | 3 | 3 | 2.2 |

SSA = Specific surface area,
PV = Pore volume,
APD = Average pore diameter,
PVD = Pore volume distribution.

For Evaluating of prototypes of this Example 2 the same microplant (FIG. 4) as in Example 1 was used, during time-on-stream of 200 h using heavy crude oil as feedstock. Heavy crude properties are presented in Table 5. Evaluation conditions are the same used in Example 1.

TABLE 5

Physical and chemical properties of heavy crude oil used to evaluate the catalysts of Example 2 at microplant scale.

| Properties | |
| --- | --- |
| Density at 20° C., g/mL | 0.925 |
| API Gravity | 21.5 |

TABLE 5-continued

Physical and chemical properties of heavy crude oil used to evaluate the catalysts of Example 2 at microplant scale.

| Properties | |
|---|---|
| Conradson carbon, wt % | 10.9 |
| Nitrogen content, wt % | 0.3 |
| Sulfur content, wt % | 3.5 |
| Metals, wppm | |
| Ni | 49.5 |
| V | 273.0 |
| (Ni + V) | 322.5 |
| Asphaltenes, nC$_7$ insolubles, wt % | 12.7 |

The results of the hydrotreating reactions are described as following.

Figure 9:
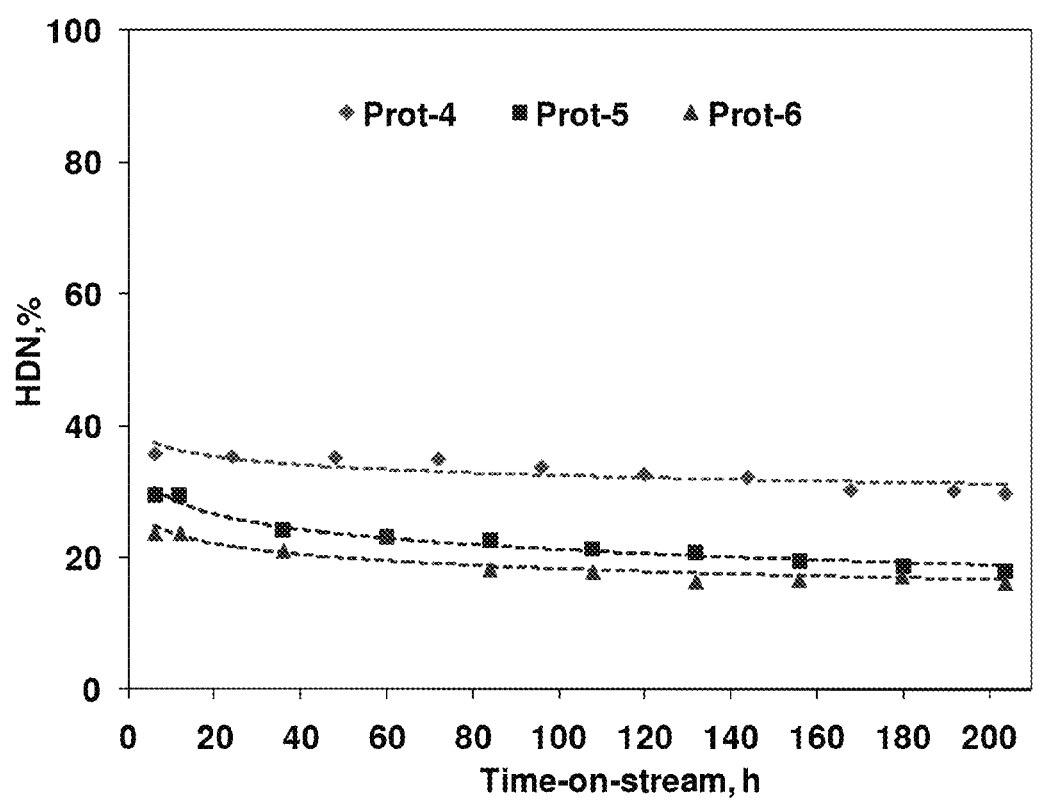
FIG. 9 depicts hydrodenitrogenation conversion at time-on-stream of 200 h (Example 2)

FIG. 9 shows the behavior of prototypes Prot-4, Prot-5, and Prot-6 on HDN reaction, where it is observed that Prot-4 has higher initial activity and stability during time-on-stream of 200 h in comparison with prototypes Prot-5 and Prot-6. The behavior of Prot-5 and Prot-6 in the HDN reaction is similar, because these prototypes present similar deactivation, 11.5 and 7.5%, respectively.

Figure 10:
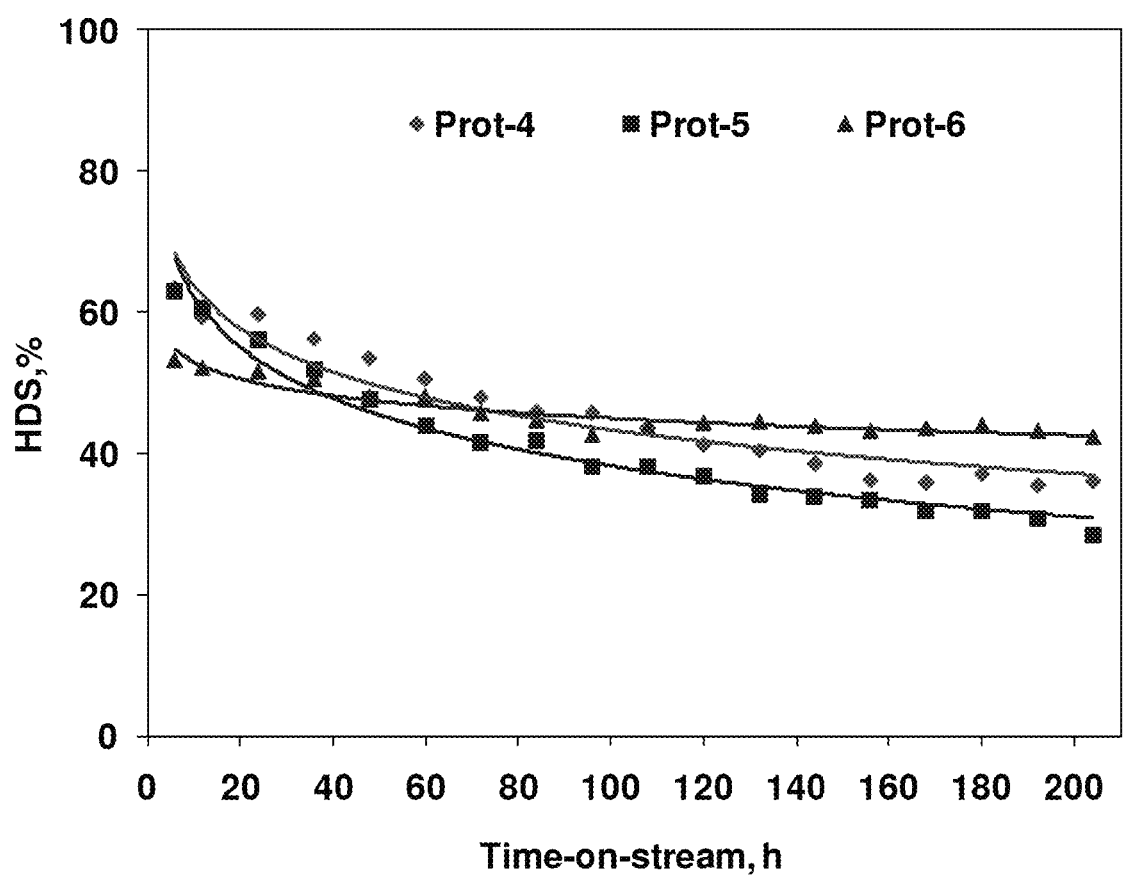
FIG. 10 depicts hydrodesulfurization conversion at time-on-stream of 200 h (Example 2)

FIG. 10 shows the HDS activity of the three prototypes Prot-4, Prot-5, and Prot-6, which have the following initial activity trend Prot-4~Prot-5>Prot-6, although the decrease in activity during time-on-stream follows the trend: Prot-5 (34.5%)>Prot-4 (26.8%)>Prot-6 (11%).

Figure 11:
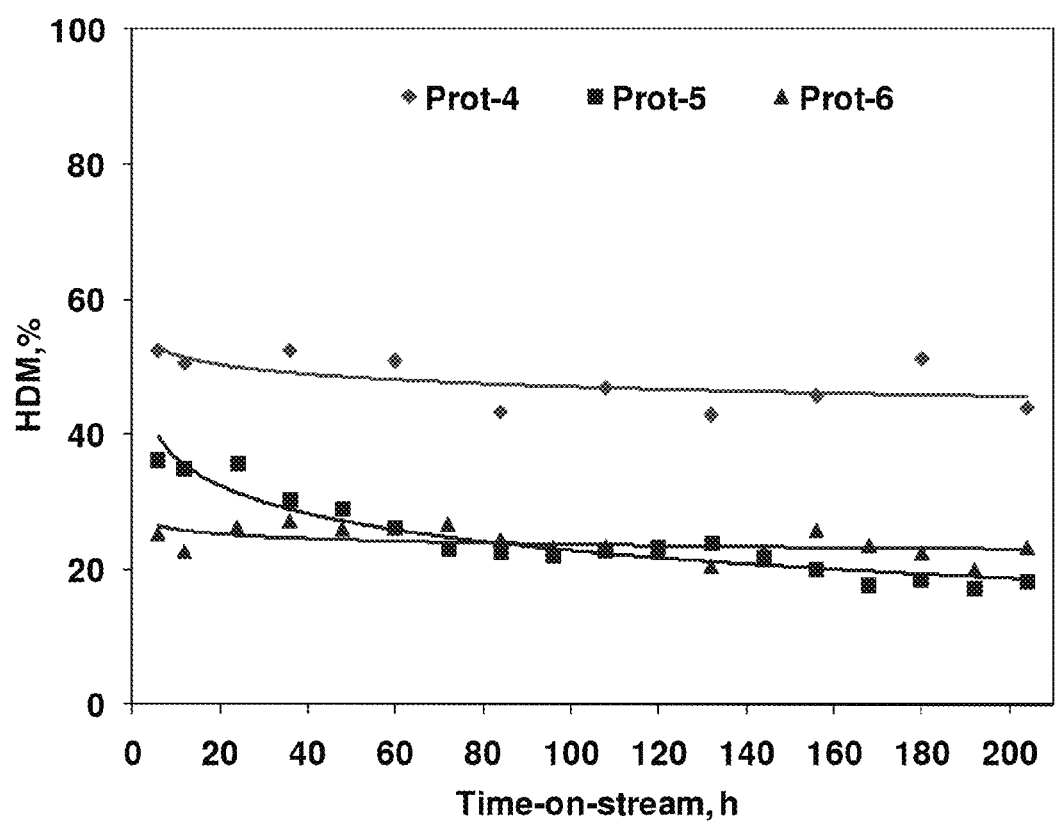
FIG. 11 depicts hydrodemetallization conversion at time-on-stream of 200 h (Example 2)

The behavior of HDM (FIG. 11) is similar to that shown for HDN (FIG. 9). The prototype that displays greater HDM activity is prototype Prot-4 with an initial activity of 52.4% and a final activity of 43.9% at time-on-stream of 200 h giving for this prototype a conversion drop of 8.5%, followed by that observed for Prot-5 with a drop in conversion of 18.3%. It is noteworthy that although prototype Prot-6 had the lowest initial activity (25.3%) its drop in conversion was only 2.1%.

Figure 12:
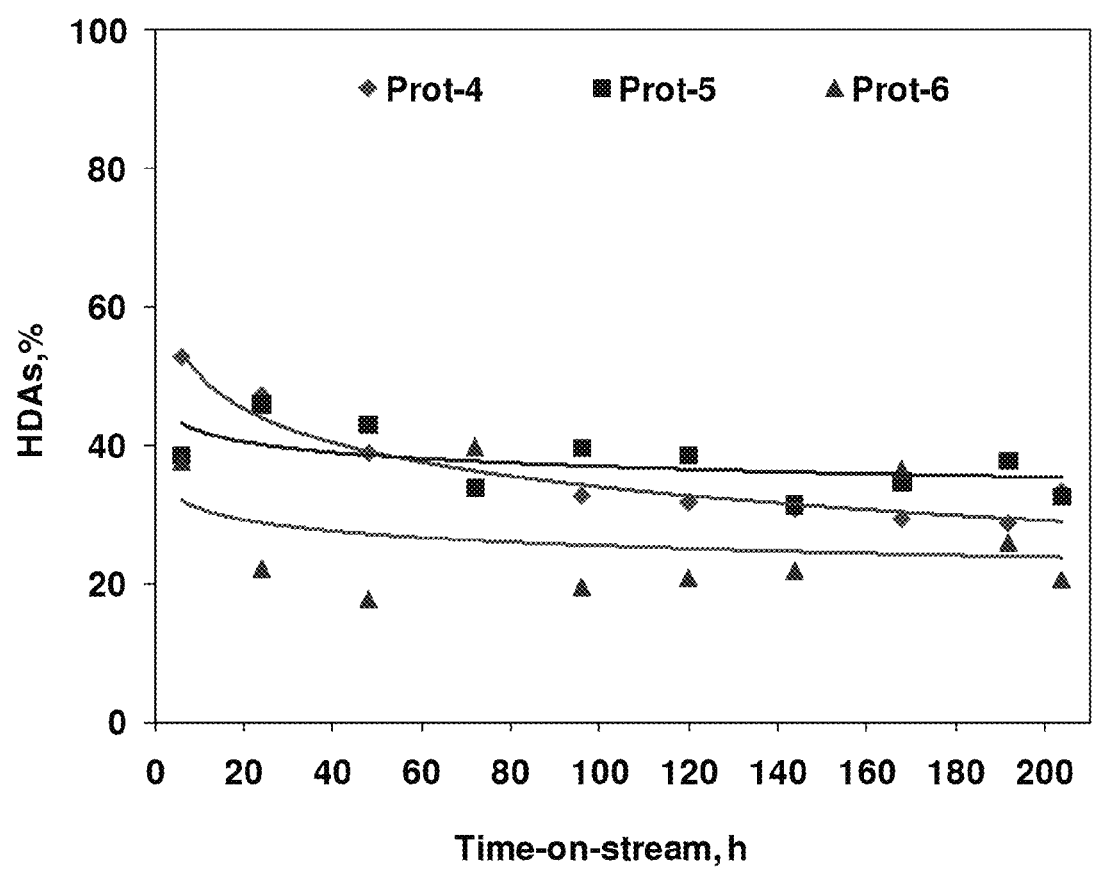
FIG. 12 depicts hydrodenitrogenation conversion at time-on-stream of 200 h (Example 2)

Regarding the HDA's reaction presented in FIG. 12, the deactivation presents the following trend Prot-4>Prot-6>Prot-5. Therefore, in accordance with the initial activities of each catalyst, the final activity after 200 h of time-on-stream is: Prot-5>Prot 4>Prot-6.

Figure 13:
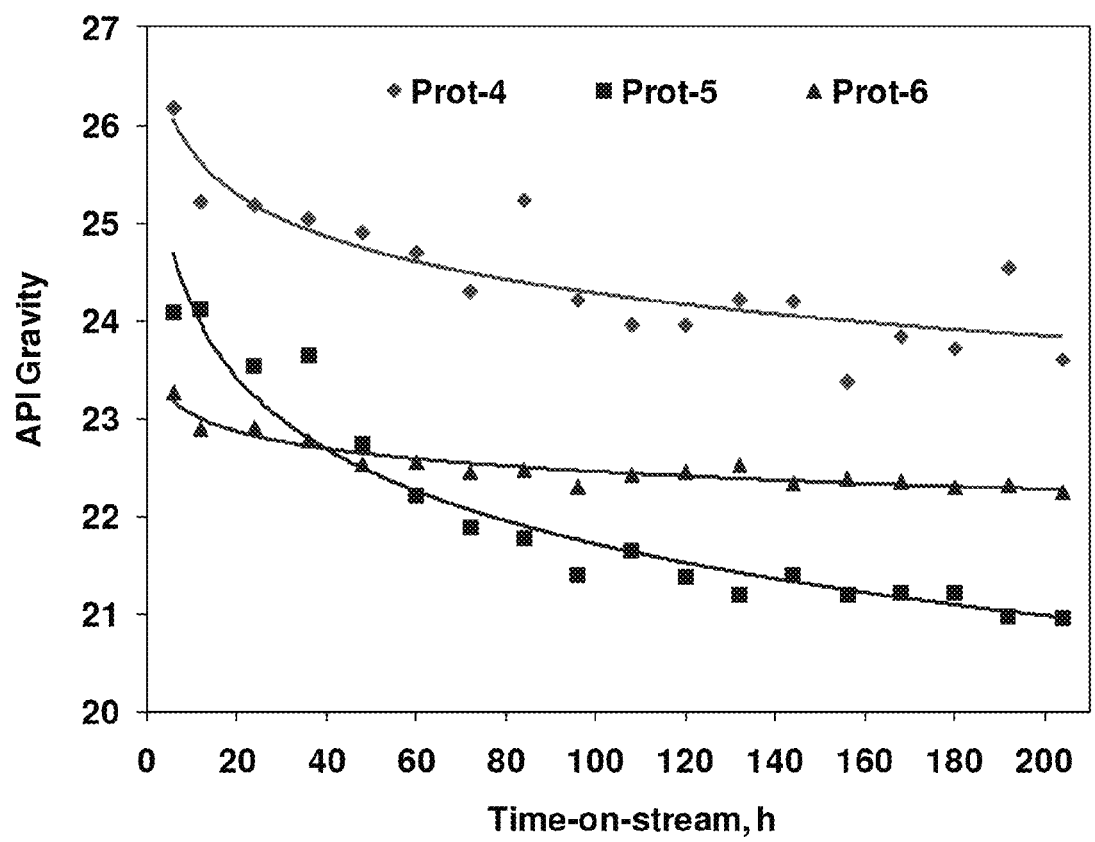
FIG. 13 shows API Gravity of the product at time-on-stream of 200 h (Example 2)

With respect to the API gravity of the product, shown in FIG. 13, prototype Prot-4 produced lighter products (high API gravity) followed by prototype Prot-6 having an average difference in these prototypes of ±3° API gravity. Prototype Prot-5, which initially produced a high API gravity of 24.8° API in products, after 200 h of time-on-stream, its product reaches the value of 21.5 API gravity, which is the same as that of the heavy crude oil feedstock.

Figure 14:
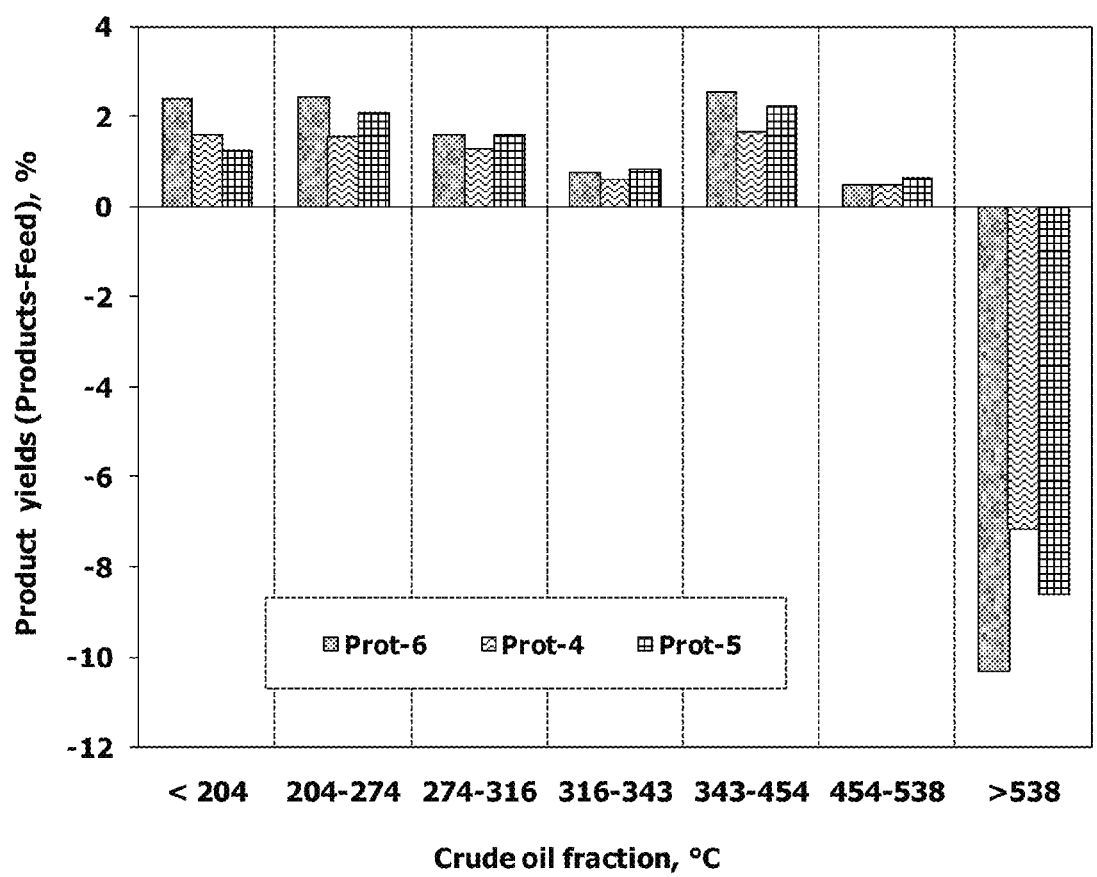
FIG. 14 shows product yields at time-on-stream of 200 h (Example 2)

FIG. 14 shows the difference of yield between the feedstock and fractions of heavy crude oil: Gasoline (<204° C.), jet fuel (204-274° C.), middle distillates (274-538° C.), and vacuum residue (>538° C.), where Prot-6 showed the higher vacuum residue conversion, higher yield to middle distillates, higher yield to jet fuel, and higher yield to the gasoline fraction, followed by Prot-5 and finally Prot-4, having an increase in yield of gasoline fraction with respect to the feedstock of 2.5, 1.8, and 1.5% for prototypes Prot-6, Prot-5, and Prot-4, respectively.

Example 3

Figure 15:
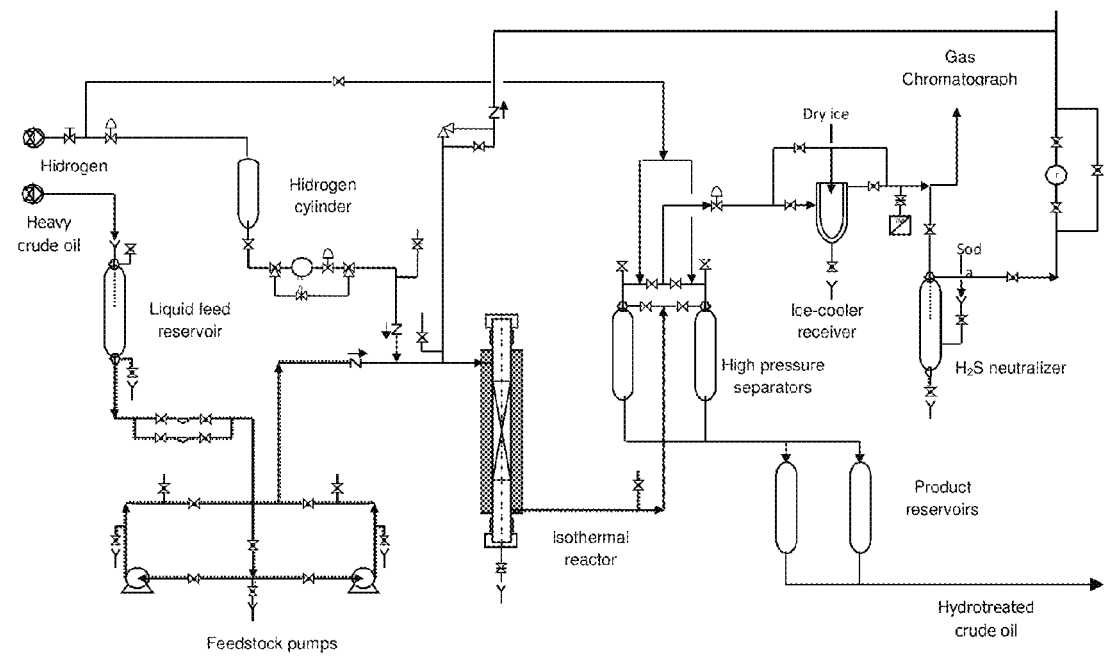
FIG. 15 shows a schematic representation of the pilot plant used in the evaluation of the catalysts obtained by the present invention.

The activity of the catalysts of the present invention was also evaluated in a pilot plant. FIG. 15 presents a flow chart that illustrates the pilot plant.

The catalytic evaluation of this example was carried out in a pilot plant scale with prototype Prot-6 (71.86 g). The synthesis of this catalytic prototype is described in the Example 2 of the present invention. The uploading of this prototype to the reactor was performed as follows: 100 mL of Prot-6 with 50 mL of inert material (silicon carbide SiC, 30 mesh), 5 beds each one containing 10 mL of inert and 20 mL of Prot-6 were placed in the reactor. The operating temperatures were 360, 370, and 380° C. each one was maintained for 144 hours, the time-on-stream was 432 h. Heavy crude oil was used as feedstock. The operating conditions are shown in Table 6. The heavy crude oil properties are the same as in Example 2 (Table 5).

TABLE 6

Operating conditions at pilot plant scale for the evaluation of catalyst from Example 3

| Variables | |
|---|---|
| Temperature, ° C. | 360, 370 y 380 |
| Pressure, kg/cm$^2$ | 100 |
| H$_2$ flow, L/h | 47.9 |
| Feedstock flow, mL/h | 50 |
| LHSV, h$^{-1}$ | 0.5 |
| H$_2$/HC ratio, ft$^3$/bbl | 5000 |
| Operating mode | Downflow |
| Time-on-stream, h | 432 |
| Catalyst volume, mL | 100 |
| Extrudate diameter, mm | 1-3 |
| Extrudate length, mm | 2-7 |

Figure 16:
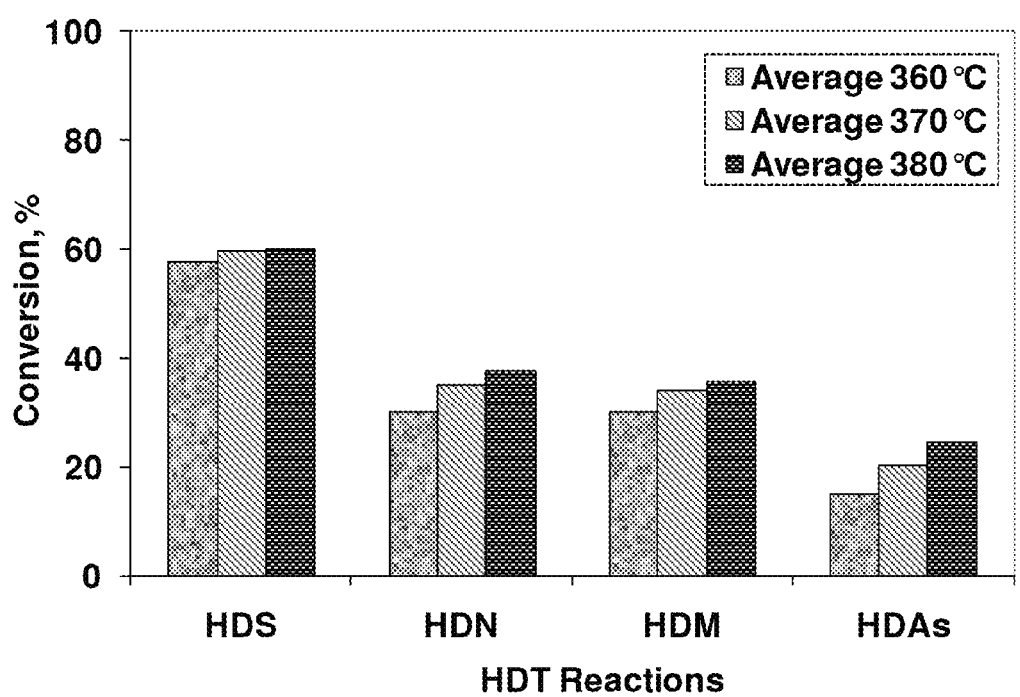
FIG. 16 shows hydrotreating conversions at time-on-stream of 432 h (Example 3)
Figure 17:
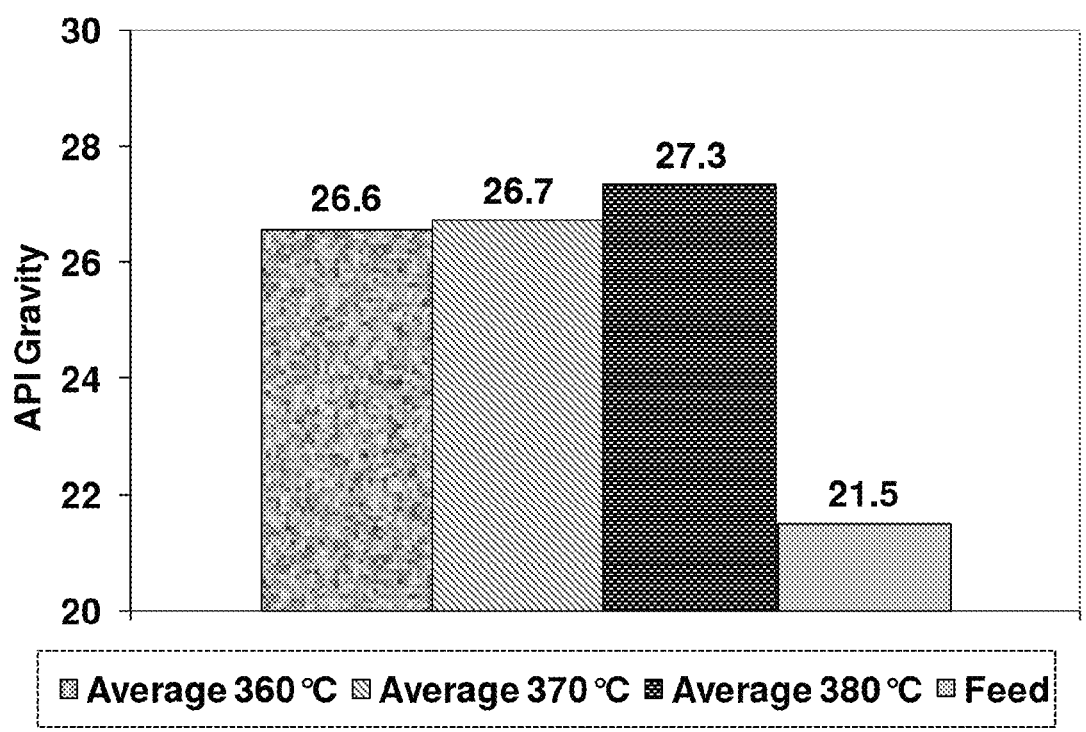
FIG. 17 shows API Gravity of product at time-on-stream of 432 h (Example 3)

FIG. 16 shows the results for hydrotreating reactions with prototype Prot-6 at different reaction temperatures, 360, 370, and 380° C. at 432 h of time-on-stream. It is observed that as the reaction temperature increases, the activity of HDS, HDN HDM, and HDA's also increases, it can also be seen that the conversion levels obtained in each reaction are as follows: HDS (60%)>HDN (38%)>HDM (36%), and HDA's (28%) wherein the number in parenthesis is the conversion at 380° C. A similar behavior is also observed for the API gravity of the product; when the reaction temperature increases, the API gravity also increased, these values are illustrated in FIG. 17, which shows that at temperatures of 360, 370, and 380° C., the API gravity values obtained are 26.6, 26.7, and 27.3° API. The values of API gravity at each reaction temperature with respect to heavy crude oil (21.5° API) were: 5.1° API (360° C.), 5.2° API (370° C.), and 5.8° API (380° C.).

Figure 18:
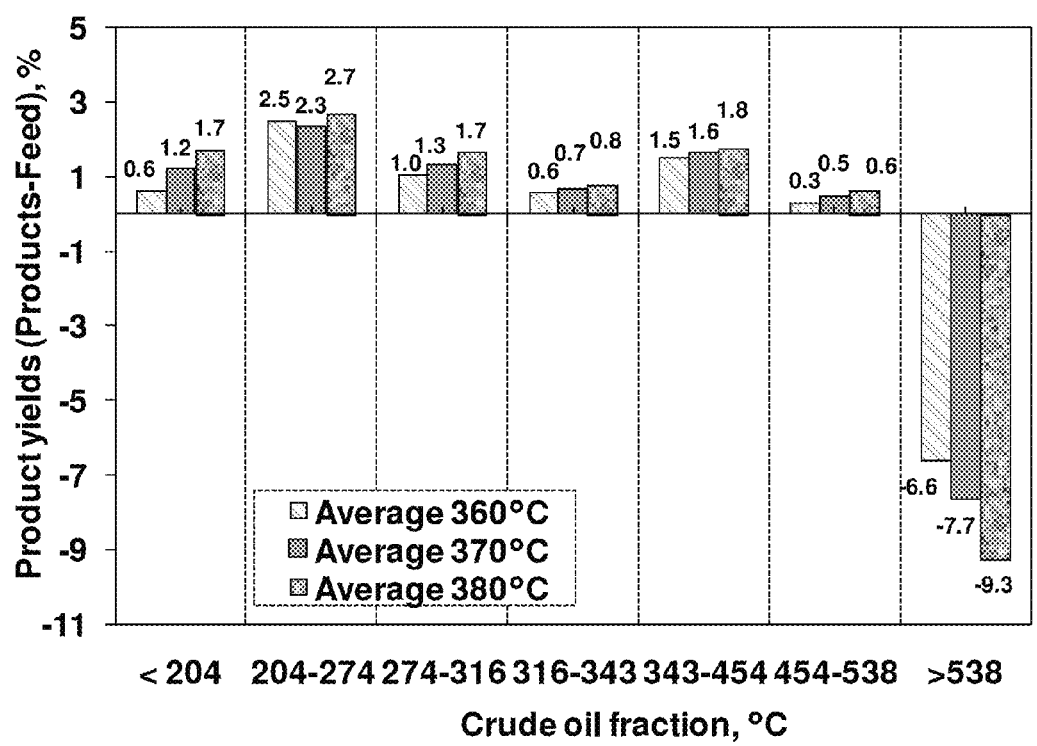
FIG. 18 shows product yields at temperatures of 360, 370, and 380° C., at time-on-stream of 32 h.

The FIG. 18 shows the values of the difference of products of each fraction with respect to the feedstock.

By increasing the reaction temperature from 360 to 380° C., there is a significant reduction of the heavy fraction (>538° C.), which decreases −6.6%, −7.6%, and −9.2% at the reaction temperatures of 360 to 370, and 380° C., respectively. The yield of the other fractions with boiling points lower than 538° C. increases with the reaction temperature, the fraction which showed the greater benefit in yield was the jet fuel with 2.5, 2.3, and 2.7% at temperatures of 360, 370, and 380° C., respectively.

Example 4

Figure 19:
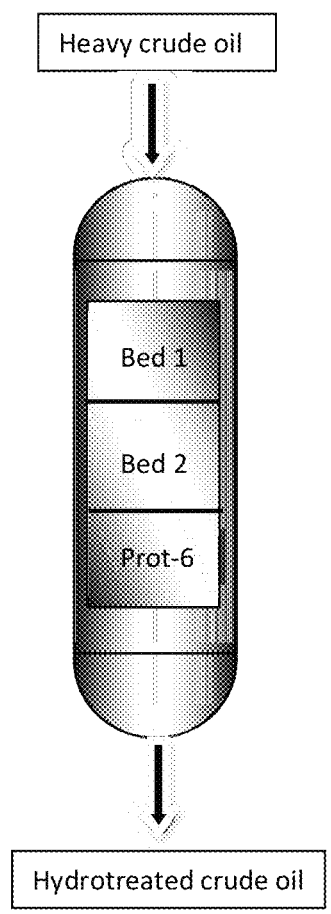
FIG. 19 shows a multi-bed system in a fixed bed reactor (Example 4)

For this example 4, the prototype Prot-6 (60 mL) was placed in the third catalytic bed of fixed bed reactor, the catalytic beds 1 and 2 (45 mL each) are NiMo catalysts supported on alumina (FIG. 19).

This evaluation was performed at pilot plant scale (FIG. 15, Example 3) at a pressure of 100 kg/cm$^2$, space velocity (LHSV) of 0.25 h$^{-1}$, temperatures of 360° C. (100 h), 380° C. (48 h), 400° C. (48 h), 410° C. (48 h), and 380° C. (48 h) for a total time-on-stream of 292 h. The operating conditions and properties of the feedstock are reported in Tables 8 and 9, respectively.

TABLE 8

Operating conditions at pilot plant scale in a multistage system (Example 4)

| Variables | Pilot plant scale Multistage system |
|---|---|
| Temperature, ° C. | 360, 380, 400, 410 y 380 |
| Pressure, kg/cm$^2$ | 100 |
| H$_2$ flow, L/h | 47.9 |
| Feedstock flow, mL/h | 50 |
| LHSV, h$^{-1}$ | 0.25 |
| H$_2$/HC ratio, ft$^3$/bbl | 5000 |
| Operating mode | Downflow |
| Time-on-stream, h | 292 |
| Volume of catalyst, mL | 150 |
| Extrudate diameter, mm | 1-3 |
| Extrudate length, mm | 2-7 |

TABLE 9

Physical and chemical properties of the feedstock of example 4

| Variables | Residue from Extra heavy crude oil |
|---|---|
| Density at 20° C., g/mL | 1.038 |
| API Gravity | 4.4 |
| Conradson carbon, wt % | 21.48 |
| Nitrogen, wt % | 0.6003 |
| Total sulfur, wt % | 6.24 |
| Metals, wppm | |
| Ni | 119 |
| V | 572.4 |
| (Ni + V) | 691.4 |
| Asphaltenes, insolubles in nC$_7$, wt % | 25.19 |

The feedstock entering the first catalytic bed is a residue obtained from extra heavy crude oil. It is noteworthy that when the feedstock reaches the third catalytic bed where the Prot-6 is located, the metal content is reduced at values similar to those in a heavy crude.

Figure 20:
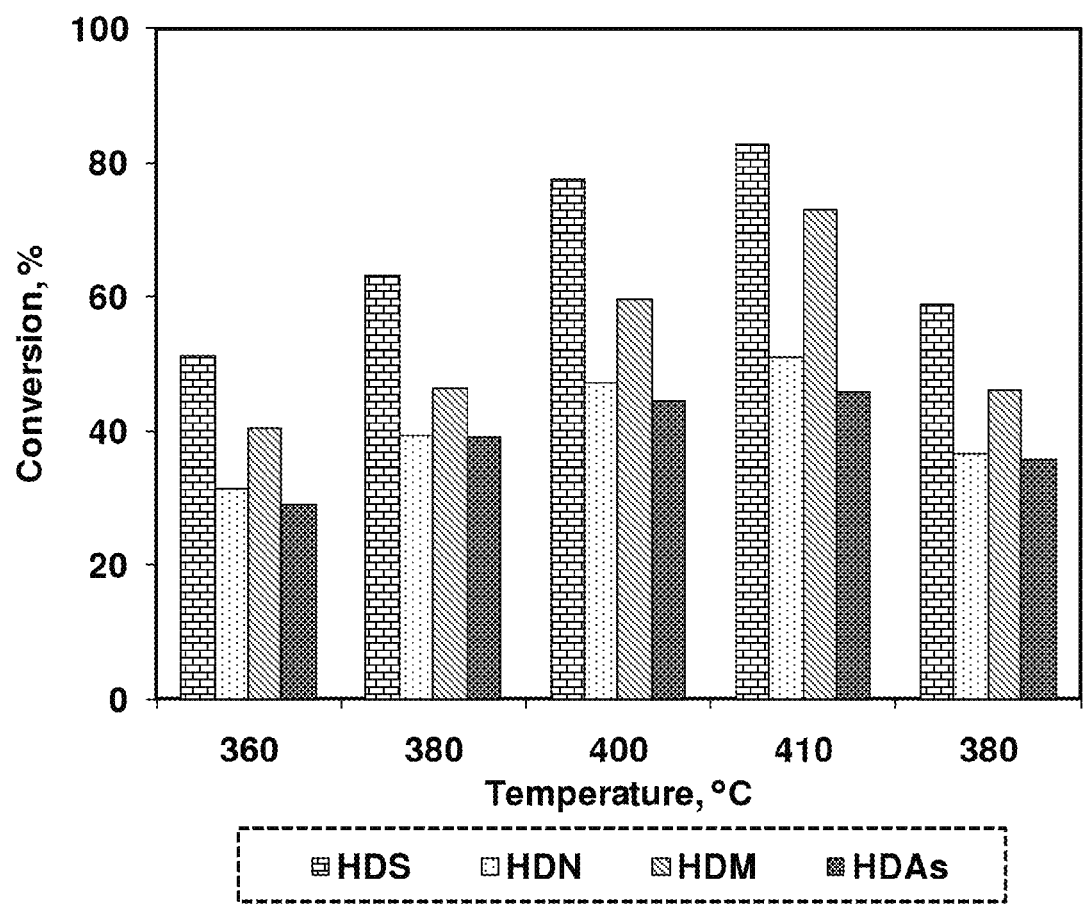
FIG. 20 shows hydrotreating conversions (hydrodesulfurization, hydrodenitrogenation, hydrodemetallization, hydrodeasphaltenization) at temperatures of 360, 380, 400, 410, and 380° C., at time-on-stream of 292 h (Example 4)

FIG. 20 shows the variation in the conversion in each HDT reaction when the operating temperature in the reactor varies.

It is observed that by increasing the reaction temperature from 360 to 410° C. the conversion of all the reactions increases. The order of activity of the different reactions is HDS>HDM>HDN>HDA's.

By changing the temperature from 360 to 410° C. the conversions varied 51.1-82.6%, 40.3-72.8%, 31.3-50.9%, and 28.9-45.8% for the of HDS, HDM, HDN, and HDA's reactions, respectively.

This indicates that the HDN and HDA's reactions are the most difficult to perform.

When the temperature is returned to 380° C., it is observed a slight decrease in the level of conversion in all reactions compared with the initial values observed at 380° C.

Figure 21:
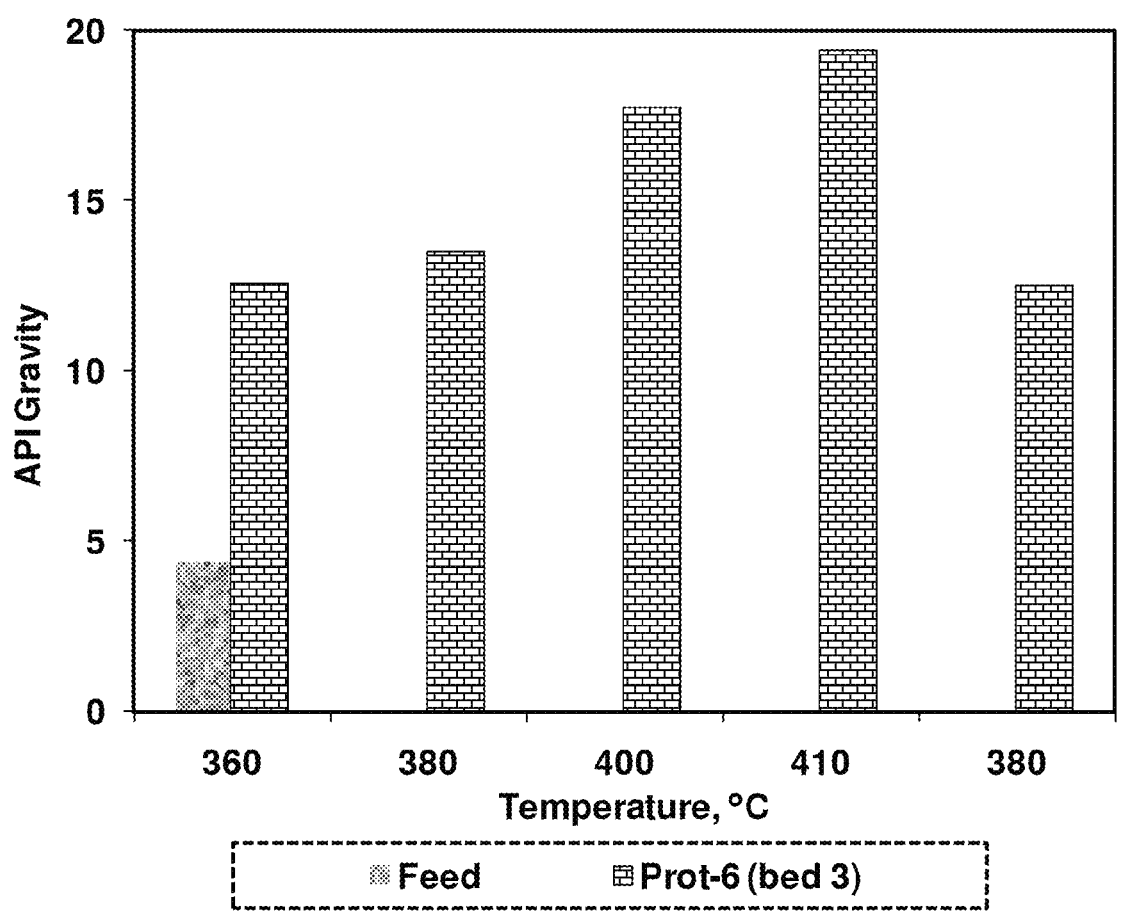
FIG. 21 shows API gravity of the product at temperatures of 360, 380, 400, 410 and, 380° C., at time-on-stream of 292 h (Example 4)

The API gravity (FIG. 21) increases with the reaction temperature. The feedstock residue has an API gravity of 4.4°. The API gravity in the product at each temperature increased as follows 360° C. (8.2° API), 380° C. (9.1° API), 400° C. (13.3° API), 410° C. (15° API), and 380° C. (8.1° API). When the temperature is again fixed at 380° C., it is observed an increase in the API gravity of 8.1°, which is slightly lower than the value of 9.1° API observed before operating the reactor at 400° and 410° C. The results indicate that employing Prot-6 catalyst in the third bed of the reactor allows for a better quality product with 19.4° API at 410° C., which means an increment of 15° API with respect to the feedstock (4.4° API). The highest increase in API gravity is observed when the reactor operating temperature increases from 380 to 400° C.

Figure 22:
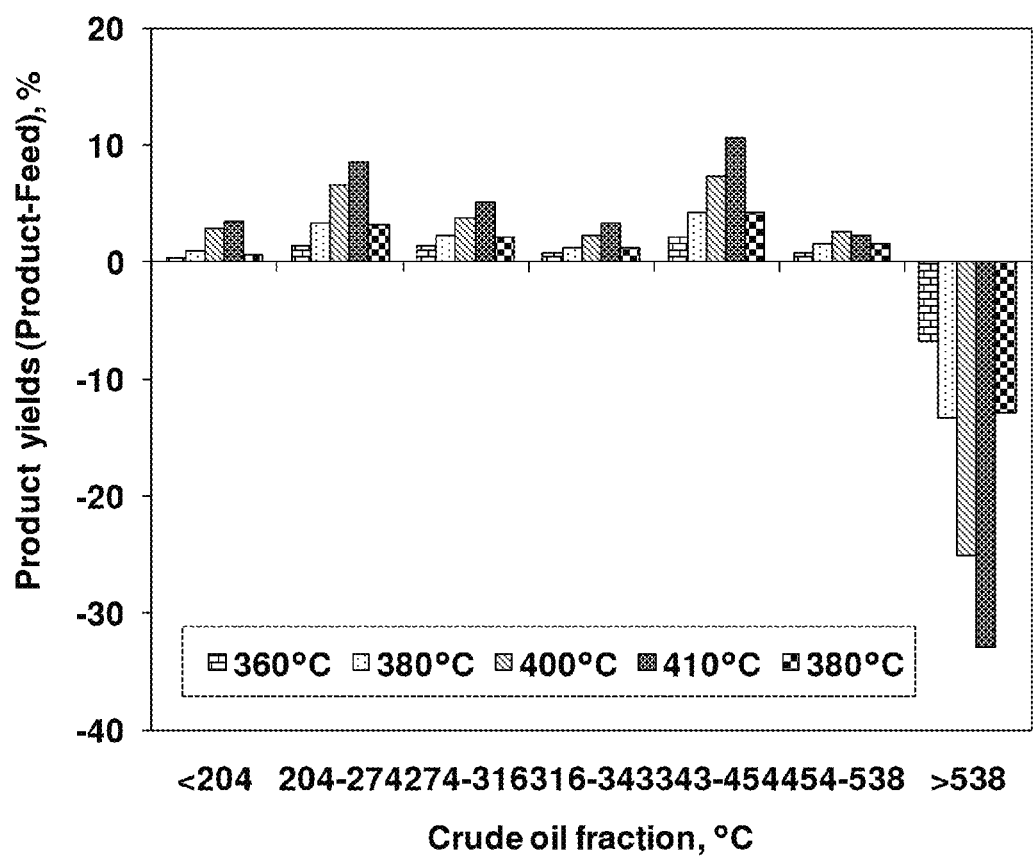
FIG. 22 shows product yields at temperatures of 360, 380, 400, 410, and 380° C. at time-on-stream of 292 h (Example 4).

With respect to products yield, FIG. 22 shows that it increases with the reaction temperature, being higher at 410° C. The increment in the yield is notably higher in the fraction 343-454° C. (Straight run heavy gas oil and vacuum gasoil), followed by 204-274° C. (Jet fuel), 274-316° C. (Kerosene), <204° C. (Gasoline) and 316-343° C. (Straight run light gas oil), and finally the fraction 454-538° C. (vacuum heavy gas oil). According the information mentioned above the yield of residue (>538° C.) decreases when the reaction temperature increases. The observed decrease in the vacuum residue (>538° C.) yield is 6.74% at 360° C. and 33% at 410° C.

What is claimed is:

1. A catalyst for hydrocracking of heavy crude oils and residues to increase the production of intermediate distillates comprising a catalyst support obtained from boehmite, zeolite Y, and SBA-15 in a molar ratio of 60-85:5-15:10-35, respectively, and where said catalyst has a cylindrical shape with a diameter of 1.59 mm and a length of 2-7 mm and includes 3-15 wt % of a Group VIB metal comprising molybdenum as molybdenum oxide or molybdenum sulfide and 1-5 wt % of a Group VIII metal comprising nickel as nickel oxide or nickel sulfide, said catalyst having a specific surface area of 150-300 m$^2$/g, an average pore diameter of 6.0 to 15.0 nm, a pore volume of 0.2 to 0.7 cm$^3$/g, and a pore distribution of 20% of pores having a diameter of up to 5 nm, 70 to 85% of pores having a diameter of 5 to 50 nm, and less than 5% of pores having a diameter greater than 50 nm, and a total acidity at 100° C. equivalent to 180 to 360 micromoles of pyridine per gram of catalyst.

2. The catalyst of claim 1, wherein the support is prepared by mechanical blending of a boehmite, zeolite and SBA-15, which is peptized with nitric acid, extruded, and calcined.

3. The catalyst of claim 2, wherein the support is impregnated with a solution of ammonium heptamolybdate and nickel nitrate to obtain a Mo and Ni impregnated catalyst.

4. The catalyst of claim 1, wherein said Mo and said Ni are present in a molar ratio of Mo/Ni+Mo=0.3.

5. A catalyst for hydrocracking heavy crude oils and residues to increase production of intermediate distillates, wherein said catalyst comprises a catalyst support obtained from boehmite, zeolite Y, and SBA-15 in a molar ratio of 60-85:5-15;10-35, Mo and Ni, and is prepared by a method of preparing a support by combining boehmite, zeolite Y, and SBA-15 in amounts of 60-85 wt %, 5-15 wt % and 10-35 wt %, respectively, peptizing the resulting mixture, drying the mixture and calcining to obtain the support, and impregnating said support with a solution of ammonium heptamolybdate and nickel nitrate, drying the impregnated support, and calcining to obtain said catalyst containing Mo and Ni, wherein said catalyst comprises 3-15 wt % of molybdenum as molybdenum oxide or molybdenum sulfide and 1-5 wt % of nickel as nickel oxide or nickel sulfide, said catalyst having a specific surface area of 150-300 m²/g, an average pore diameter of 6.0 to 15.0 nm and a pore volume of 0.2 to 0.7 cm³/g, and a pore distribution of 20% of a pore volume of pores of 0 to 5 nm, 70 to 85% of its pore volume of pores of 5 to 50 nm and less than 5% of said pore volume in pores with diameter greater than 50 nm, and a total acidity at 100° C., equivalent to 180 to 360 micromoles of pyridine per gram of catalyst.

6. The catalyst of claim 5, wherein said catalyst has 74-85% of the pores with a diameter in the range of 5-50 nm.

7. The catalyst of claim 1, wherein said catalyst has a pore diameter of 6-12 nm.

8. The catalyst of claim 1, wherein said catalyst comprised 9-12 wt % molybdenum and 2.8-4.4 wt % nickel.

9. The catalyst of claim 8, wherein said catalyst has surface area of 220-235 m²/g.

10. The catalyst of claim 9, wherein said catalyst has a pore volume of 0.3-0.6 cm3/g, and average pore diameter of 6.6-9.2 nm, and a pore distribution of <5 nm in an amount of 13.6-23.3 vol %, 5-50 nm in an amount of 75.6-84.8 vol %, and >50 nm in an amount of 1.3-3.0 vol %.

11. The catalyst of claim 1, wherein said catalyst has a molybdenum concentration of 10 wt % and a nickel concentration of 2.6 wt %.

12. The catalyst of claim 1, wherein said catalyst comprised 74-85% of pores in a range of 5-50 nm.

\* \* \* \* \*